US012526464B2

(12) United States Patent
Gulgas et al.

(10) Patent No.: US 12,526,464 B2
(45) Date of Patent: Jan. 13, 2026

(54) CENTRALIZATION OF IMAGE STREAMS FROM MULTIPLE CAMERAS

(71) Applicant: Irides LLC, North Ridgeville, OH (US)

(72) Inventors: Spyridon George Gulgas, Amherst, OH (US); Brian Shell, Cleveland, OH (US); Dan Shell, North Ridgeville, OH (US)

(73) Assignee: Irides LLC, North Ridgeville, OH (US)

( * ) Notice: Subject to any disclaimer, the term of this patent is extended or adjusted under 35 U.S.C. 154(b) by 0 days.

(21) Appl. No.: 18/381,700

(22) Filed: Oct. 19, 2023

(65) Prior Publication Data

US 2024/0137595 A1   Apr. 25, 2024
US 2024/0236397 A9   Jul. 11, 2024

Related U.S. Application Data

(60) Provisional application No. 63/417,476, filed on Oct. 19, 2022.

(51) Int. Cl.
*H04N 21/2665* (2011.01)
*H04N 21/2187* (2011.01)
*H04N 21/234* (2011.01)

(52) U.S. Cl.
CPC ..... *H04N 21/2665* (2013.01); *H04N 21/2187* (2013.01); *H04N 21/23418* (2013.01)

(58) Field of Classification Search
CPC ........... H04N 21/2665; H04N 21/2187; H04N 21/23418
See application file for complete search history.

(56) References Cited

U.S. PATENT DOCUMENTS

2006/0064599 A1 *  3/2006  Yoshida ............. H04L 41/0843
                                                      713/182
2019/0313062 A1 * 10/2019  Worrill ..................... H04N 7/18

FOREIGN PATENT DOCUMENTS

JP       2003076812 A  *  3/2003
JP       4820073 B2      11/2011

OTHER PUBLICATIONS

International Search Report; ISA/US, Commissioner for Patents; International Application No. PCT/US2023/077290; Feb. 7, 2024; 2 pages.

(Continued)

*Primary Examiner* — Nnenna N Ekpo
(74) *Attorney, Agent, or Firm* — Taft Stettinius & Hollister LLP; Patrick J. Palascak

(57) ABSTRACT

Systems and methods include providing image streams captured by cameras by scraping camera parameters that are updated and analyzed as the cameras capture the image streams. Embodiments of the disclosure relate to scraping the camera parameters from a corresponding server as the camera parameters for each camera are updated. The camera parameters are stored in an image streaming database thereby linking the camera parameters for each camera scraped from the corresponding server as stored in the image streaming database. The camera parameters are transformed as scraped from each corresponding server into a unique identifier as thereby stored in the image streaming database. The unique identifier when accessed via the image streaming database enables access to each image stream captured by each camera as streamed from each corresponding server. Each image stream is provided from each corresponding server based on the unique identifier stored in the image streaming database.

20 Claims, 6 Drawing Sheets

(56) References Cited

OTHER PUBLICATIONS

Written Opinion of the International Searching Authority; ISA/US, Commissioner for Patents; International Application No. PCT/US2023/077290; Feb. 7, 2024; 6 pages.
Mjayakumar et al., "Dynamic Resource Provisioning for Data Streaming Applications in a Cloud Environment", 2nd IEEE International Conference on Cloud Computing Technology and Science, Feb. 28, 2011.

* cited by examiner

CENTRALIZATION OF IMAGE STREAMS FROM MULTIPLE CAMERAS

CROSS-REFERENCE TO RELATED APPLICATIONS

The present application is U.S. Nonprovisional patent application which claims the benefit of U.S. Provisional Application No. 63/417,476, filed Oct. 19, 2022 which is incorporated herein by reference in its entirety.

BACKGROUND

Entities incorporate a complicated weave of data to fulfill the data analytics needs of modelling events that have had a significant impact on the entity and/or the customer of the entity. Entities are limited in data resources in that entities have a fixed number of cameras in which the entities have access to that would provide useful data based on the image streams captured by the cameras of the event. Thus, entities strive to have access to as a complete and a high quality data set so that such entities may execute the necessary data analytics to properly and accurately model the event for the benefit of the entity and/or the customer of the entity.

Once an entity has engaged in the data analytics of the image data available to the entity to model the event, the entity attempts to stitch together the image data to determine the outcome of the event all the way back to what triggered the event. In order to maximize the image data available to the entity, the entity may attempt to extract the image data to be as robust as possible to increase the accuracy of the modeling of the event. Conventionally, the entity accesses image streams from cameras that are publicly available and not controlled by the entity in order for the entity to increase the image data available to model the event. In doing so, the entity may attempt to access large conventional databases that includes links to the image streams generated by the publicly available cameras. However, such large conventional databases accumulate links of dead cameras and/or cameras not involved with the event thereby tainting the data analytics executed by the entity to model the event and hindering the accuracy.

BRIEF SUMMARY

Embodiments of the present disclosure relate to providing a centralized platform in which entities may access links to numerous cameras to receive image streams as captured by the numerous cameras as streamed from numerous different platforms that the cameras are associated with via the centralized platform. A system may be implemented to provide a plurality of image streams captured by a plurality of cameras by scraping a plurality of camera parameters associated with each camera that are updated and analyzed as the cameras capture the image streams. The system includes at least one processor and a memory coupled with the processor. The memory includes instructions that when executed by the processor cause the processor to scrape each plurality of camera parameters associated with each camera from a corresponding server that stores each plurality of camera parameters associated with each camera as each plurality of camera parameters for each camera is updated in each corresponding server. Each plurality of camera parameters provide access to each plurality of image streams captured by each corresponding camera as streamed from each corresponding server. The processor is configured to store each plurality of camera parameters associated with each corresponding camera scraped from each corresponding server in an image streaming database thereby linking the plurality of camera parameters associated with each corresponding camera scraped from each corresponding server to the plurality of camera parameters associated with each corresponding camera as stored in the image streaming database. The processor is configured to transform each plurality of camera parameters associated with each camera as scraped from each corresponding server into a unique identifier for each camera as thereby stored in the image streaming database. The unique identifier when access via the image streaming database enables access to each image stream captured by each camera as streamed from each corresponding server. The processor is configured to provide each image stream captured by each camera as streamed from each corresponding server based on the unique identifier stored in the image streaming database when accessed enables each image stream captured by each camera to be streamed from each corresponding server via the image streaming database.

In an embodiment, a method provides a plurality of image streams captured by a plurality of cameras by scraping a plurality of camera parameters associated with each camera that are updated and analyzed as the cameras capture the image streams. Each plurality of camera parameters associated with each camera may be scraped from a corresponding server that stores each plurality of camera parameters associated with each camera as each plurality of camera parameters for each camera is updated in each corresponding server. Each plurality of camera parameters provide access to each plurality of image streams captured by each corresponding camera as streamed from each corresponding server. Each plurality of camera parameters associated with each corresponding camera scraped from each corresponding server may be stored in an image streaming database thereby linking the plurality of camera parameters associated with each corresponding camera scraped from each corresponding server to the plurality of camera parameters associated with each corresponding camera as stored in the image streaming database. Each plurality of camera parameters associated with each camera as scraped from each corresponding server may be transformed into a unique identifier for each camera as thereby stored in the image streaming database. The unique identifier when accessed via the image streaming database enables access to each image stream captured by each camera as streamed from each corresponding server. Each image stream captured by each camera as streamed from each corresponding server may be provided based on the unique identifier stored in the image streaming database when accessed enables each image stream captured by each camera to be streamed from each corresponding server via the image streaming database.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

DETAILED DESCRIPTION

Figure 1:
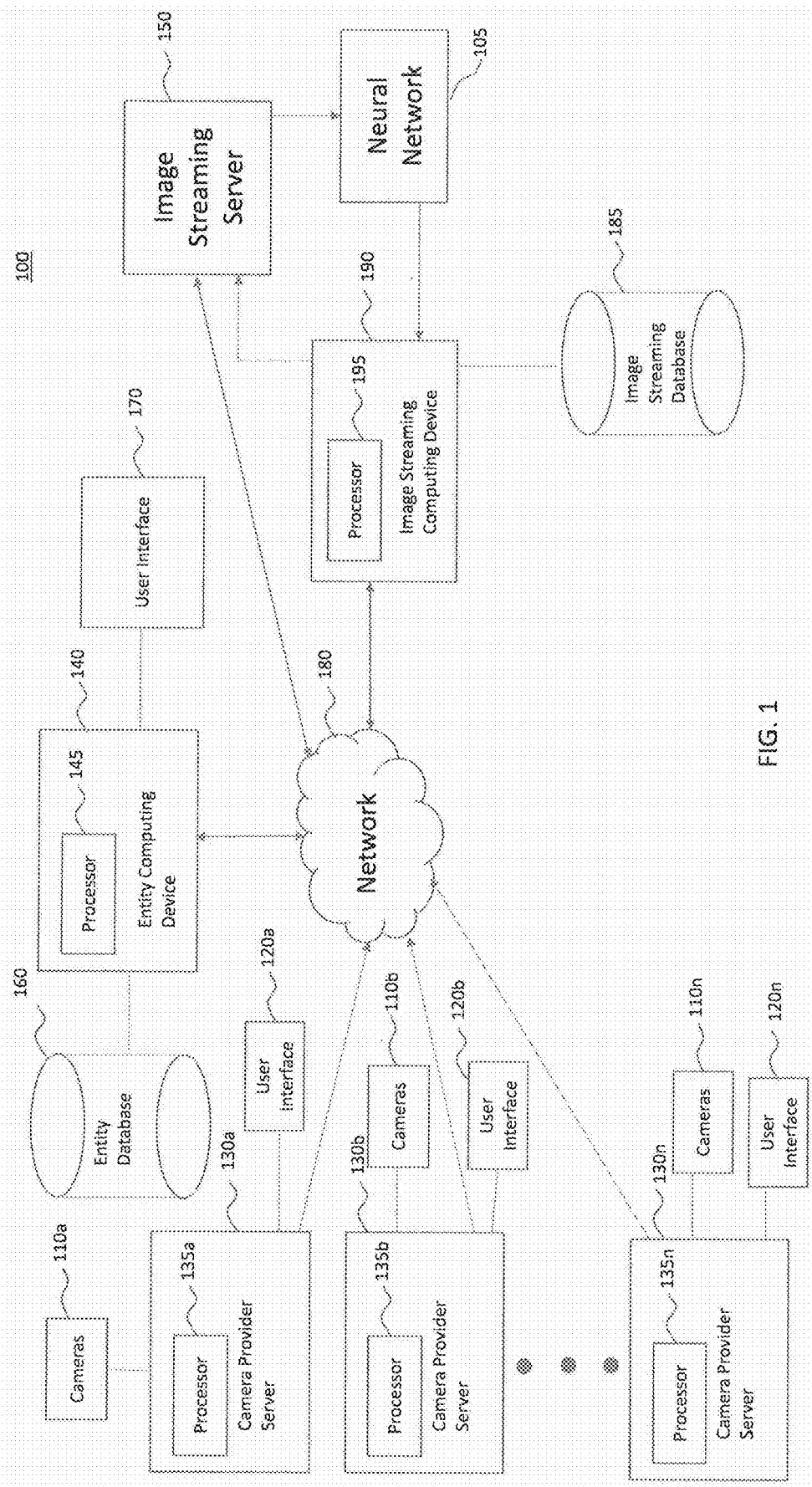
FIG. 1 shows an illustration of an image streaming system.

Embodiments of the disclosure generally relate to the updating and analysis of numerous cameras that are capturing image streams from numerous different platforms in which an entity requests to access, such as cameras that are capturing image streams of roadways in which vehicular data of the vehicles that are captured in the image streams is extracted from such image streams. In an example embodiment, the entity requests to access the image streams captured by numerous cameras from numerous different platforms but each platform is streaming the image streams from an independent server in which the image streams streamed from each independent server of each platform streams the image streams in a different format. In order for the entity to ensure that the entity is able to access the numerous different image streams streamed from the numerous different servers, an image streaming computing device may integrate the numerous different cameras for each of the numerous different platforms into an image streaming database that accounts for the different formats of the image streams for each server. The entity may then simply access image streaming database to access each image stream as captured by each camera and as streamed by each server.

However, each of the different platforms may fail to maintain the servers to ensure that each of the cameras that are accessible via the server are actually cameras that are actively capturing image streams and not cameras that are malfunctioning. For example, the Department of Transportation of each U.S. state provides access to the camera streams captured by all of the cameras positioned along the roadways of that state via the server of the state. However, numerous cameras are activated but are malfunctioning in that the cameras are capturing a blank screen or a black screen and failing capture live mage streams of the roadway. Such platforms fail to remove such malfunctioning cameras from the servers. In doing so, the entity risks tainting the vehicular data that the entity is requesting with the camera streams that are not even capturing live image streams of the roadways. Rather than have image streams from malfunctioning cameras accessible to the entity, image streaming computing device continuously curates image streaming database to ensure that the cameras that are accessible to the entity via image streaming database are capturing live image streams. Image streaming computing device removes any link to cameras that are malfunctioning and failing to capture live image streams thereby ensuring that the entity is accessing accurate vehicular data from the image streams.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

As shown in FIG. 1, an image streaming system 100 includes an image streaming computing device 190, an image streaming database 185, an image streaming server 150, a neural network 105, a plurality of camera provider servers 130(*a-n*), a plurality of cameras 110(*a-n*), a plurality of user interfaces 120(*a-n*), an entity computing device 140, a user interface 170, and an entity database 160. Image streaming computing device includes processor 190. Camera provider servers 130(*a-n*) include processor 135(*a-n*). Entity computing device 140 includes processor 145.

Image streaming computing device 190 may be a device that is capable of scraping camera parameters from different camera provider servers 130(*a-n*) that in which the different camera provider servers 130(*a-n*) each have numerous cameras 110(*a-n*) that are capturing image streams. In scraping the camera parameters from the different camera provider servers 130(*a-n*), image streaming computing device 190 may then integrate the camera parameters into image streaming database 185 and thereby provide access to image streams as streamed by each camera provider server 130(*a-n*) in a central repository. In doing so, entity computing device 140 may then access the numerous image streams as streamed by each different camera provider server 130(*a-n*) via image streaming database 190 without having to access each camera provider server 130(*a-n*) independently to stream the image streams from each camera provider server 130(*a-n*).

Examples of image streaming computing device 190 may include a mobile telephone, a smartphone, a workstation, a portable computing device, other computing devices such as a laptop, or a desktop computer, cluster of computers, set-top box, a server and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Image streaming computing device 190 may provide a plurality of image streams captured by a plurality of cameras 110(*a-n*) by scraping a plurality of camera parameters associated with each camera that are updated and analyzed as the cameras 110(*a-n*) capture the image streams. Camera provider servers 130(*a-n*), where n is an integer equal to or greater than one, may stream image streams as captured by each corresponding plurality of cameras 110(*a-n*) associated with each camera provider server 130(*a-n*). Each camera provider server 130(*a-n*) may be associated with a different plurality of cameras 110(*a-n*), where n is an integer that is equal to the quantity of camera provider servers 130(*a-n*), such that each camera provider server may stream image streams captured by numerous different cameras associated with each camera provider server 130(*a-n*).

For example, each camera provider server 130(*a-n*) may be operated by a different Department of Transportation for a different U.S. state. In such an example camera provider server 130*a* may be operated by Indiana while camera provider server 130*b* may be operated by Ohio. In doing so, camera provider server 130*a* may stream image streams captured by all of the different cameras 110*a* positioned along the roadways of Indiana and camera provider server 130*b* may stream images captured by all of the different cameras 110*b* positioned along the roadways of Ohio. Thus, each camera provider server 130(*a-n*) may stream image streams as captured by each plurality of cameras 110(*a-n*) associated with each corresponding camera provider server 130(*a-n*).

Cameras 110(*a-n*) may be positioned in an operating environment in a fixed position in which each camera 110(*a-n*) captures image streams from that fixed position in the operating environment in which camera provider server 130(*a-n*) then streams the image streams as captured by cameras 110(*a-n*) of the operating environment from the fixed positon of cameras 110(*a-n*). Cameras 110(*a-n*) may pan and/or rotate at the fixed position in the operating environment and thereby capture image streams of the operating environment as cameras 110(*a-n*) rotate and/or pan at the fixed position. Cameras 110(*a-n*) may also be moved from a first fixed position to a second fixed positon in camera provider server 130(*a-n*) transitions from streaming image streams as captured by cameras 110(*a-n*) of the first operating environment of cameras 110(*a-n*) at the first fixed position to streaming image streams as captured by cameras 110(*a-n*) of the second operating environment at the second fixed position. The operating environment of cameras 110(*a-n*) is what cameras 110(*a-n*) capture within the field of view of cameras 110(*a-n*). The operating environment 110(*a-n*) is also the conditions in which cameras 110(*a-n*) capture in the field of view as well as what cameras 110(*a-n*) are exposed. For example, the operating environment that cameras 110(*a-n*) may include conditions such as the weather conditions, traffic conditions, and so on.

The image streams captured by cameras 110(*a-n*) are live image streams that depict the operating environment in which cameras 110(*a-n*) is positioned and the activity that occurs in the operating environment as cameras 110(*a-n*) are functionally operating and capturing live image streams. The live image streams capture the operating environment and the activity as such activity is occurring. For example, image streams captured by cameras 110(*a-n*) capture activity such as vehicles that travel through the field of view of cameras 110(*a-n*) as such vehicles 110(*a-n*) are doing so thereby resulting in live image streams of the operating environment as captured by cameras 110(*a-n*). The image streams captured by cameras 110(*a-n*) may be video streams in which cameras 110(*a-n*) continuously capture the operating environment and generate a video stream lapsing a duration of time. The image streams captured by cameras 110(*a-n*) may also be static images in which the images captured by cameras 110(*a-n*) are snapshots of the operating environment that are captured at a set time. Image streams captured by cameras 110(*a-n*) of the operating environment may be any type of image stream that captures the operating environment and the activities of the operating environment that will be apparent from those skilled in the relevant art(s) without departing from the spirit and scope of the present disclosure.

In addition to the image streams captured by cameras 110(*a-n*), sensor data captured by sensors (not shown) associated with the operating environment of cameras 110(*a-n*) may also be captured. Different sensors may be positioned in the operating environment of cameras 110(*a-n*) and such sensors may capture sensor data that of the operating environment which provides additional insight as to the operating environment and the activities of the operating environment in addition to the image streams captured by cameras 110(*a-n*). For example, the different sensors positioned in the operating environment may capture sensor data such as but not limited to temperature, surface temperature, ambient temperature, wind velocity, pavement temperature, weather sensors, and/or any other type of sensor that captures sensor data that provides additional insight as to the operating environment and the activities of the operating environment in addition to the image streams captured by cameras 110(*a-n*) that will be apparent from those skilled in the relevant art(s) without departing from the spirit and scope of the present disclosure.

Camera provider server 130(*a-n*) may then stream the image streams captured by cameras 110(*a-n*) of the operating environment captured by cameras 110(*a-n*). Camera provider server 130(*a-n*) may be operated by an operating entity in which the operating entity has operating control over the cameras 110(*a-n*) associated with camera provider server 130(*a-n*). As mentioned in the example above, the operating entity may be a DOT of a state, such as Indiana, in which Indiana has control of cameras 110(*a-n*). In doing so, Indiana positions cameras 110(*a-n*) throughout the roadways of Indiana, maintains cameras 110(*a-n*), configures cameras 110(*a-n*), determines the field of view of cameras 110(*a-n*), and so on. In another example, the operating entity may be a business, such as electric utility plant, in which the business positions the cameras 110(*a-n*) throughout the property of the business, maintains cameras 110(*a-n*), configures cameras 110(*a-n*), determines the field of view of cameras 110(*a-n*) as to what operating environment of the property of the business each camera 110(*a-n*) is to capture, and so on. The operating entity may be any type of operating entity that has control of cameras 110(*a-n*) that will be apparent from those skilled in the relevant art(s) without departing from the spirit and scope of the present disclosure.

Camera provider server 130(*a-n*) may then stream the image streams captured by cameras 110(*a-n*) of the operating environment captured by cameras 110(*a-n*). The camera streams as streamed by camera provider server 130(*a-n*) may be viewed and/or analyzed with regard to the operating environment captured by cameras 110(*a-n*) as well as the activities of the operating environment. In doing so, the camera streams are provided to camera provider server 130(*a-n*) as cameras 110(*a-n*) capture the camera streams and then streamed by camera provider server 130(*a-n*) for viewing and/or analysis with regard to the operating environment and the activities of the operating environment as captured by cameras 110(*a-n*). Further camera provider server 130(*a-n*) may also stream the sensor data captured by the sensors positioned in the operating environment of cameras 110(*a-n*). The sensor data as captured by the sensors may be metadata that is then streamed by camera provider server 130(*a-n*) that may be viewed and/or analyzed with regard to the operating environment captured by cameras 110(*a-n*) as well as the activities of the operating environment. In doing so, the sensor data and/or metadata as captured by the sensors is provided to camera provider server 130(*a-n*) as the sensors capture the sensor data and/or metadata and then streamed by camera provider server 130(*a-n*) for viewing and/or analysis with regard to the operating environment and the activities of the operating environment as captured by the sensors.

Camera provider server 130(*a-n*) may stream the image streams and/or sensor data directly from camera provider server 130(*a-n*) in which the image streams and/or sensor data may be viewed and/or analyzed as streamed from camera provider server 130(*a-n*). Camera provider server 130(*a-n*) may also stream the image streams and/or sensor data via user interface 120(*a-n*). In doing so, the image streams and/or sensor data may be viewed and/or analyzed from camera provider server 130(*a-n*) via user interface 120(*a-n*). For example, camera provider server 130(*a-n*) may stream the image streams and/or sensor data via user interface 120(*a-n*) in which user interface 120(*a-n*) is a website in which the image streams and/or sensor data may be viewed and/or analyzed as streamed by camera provider server 130(*a-n*) via the website. Camera provider server 130(*a-n*) may stream the image streams and/or sensor data in any manner that will be apparent from those skilled in the relevant art(s) without departing from the spirit and scope of the present disclosure.

Examples of camera provider server 130(*a-n*) may include a mobile telephone, a smartphone, a workstation, a portable computing device, other computing devices such as a laptop, or a desktop computer, cluster of computers, set-top box, a server and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Entity computing device 140 may then receive the image streams as captured by cameras 110(*a-n*) and/or sensor data as captured by the sensors as streamed by camera provider server 130(*a-n*) in order for entity computing device 140 to view and/or analyze the image streams and/or sensor data with regard to the operating environment as well as the activities of cameras 110(*a-n*). Entity computing device 140 may be operated by an entity in which the entity has an interest in the activities of the operating environment as captured by cameras 110(*a-n*) and the sensors. In doing so, entity computing device 140 may request to receive the image streams and/or sensor data of specific operating environments as captured by cameras 110(*a-n*) and the sensors to view and/or analyze the activities of the specific operating environments.

For example, entity computing device 140 may be operated by an entity that conducts data analytics on behalf of customers to provide a complete and accurate data report as to an activity that occurred in a specific operating environment as captured by cameras 110(*a-n*) and the sensors. In doing so, the entity that conducts data analytics may provide an analysis as to the activity to the customer requesting such an analysis. For example, the customer may request a data report to qualify and quantify the potential risk or potential loss of the customer. In such an example, the entity that conducts data analytics may analyze the image streams as captured by cameras 110(*a-n*) as well as the sensor data as captured by sensors of operating environments of interest to the customer to analyze the activities of such operating environments to thereby provide the data report that qualifies and quantifies the potential risk or potential loss of the customer with regard to the specific operating environments.

As a result, such entities are entities that request the image streams and/or sensor data as streamed by camera provider server 130(*a-n*) in order to analyze the image streams and/or sensor data on behalf of customers of such entities. In doing so, entity computing device 140 acts as middleware in which entity computing device 140 operates by receiving the image streams and/or sensor data as streamed by camera provider server 130(*a-n*) and executes data analytics on the image streams and/or sensor data to provide data analysis to the customer.

In another example, entity computing device 140 may be operated by an end user that requests to access the image streams and/or sensor data directly as streamed from camera provider server 130(*a-n*) without any entity in between the end user and camera provider server 130(*a-n*). For example, the end user may request to view image streams of roadways that the end user may be travelling on to determine the weather conditions and the traffic conditions of the roadways as provided by the image streams captured by cameras 110(*a-n*) and the sensor data captured by the sensors positioned along the roadways. In such an example, camera provider server 130(*a-n*) may stream the image streams and/or sensor data of the roadways requested to the user directly to the smart phone of the end user. The end user may then view the image streams and/or sensor data of the roadways via the smart phone of the end user. As a result, entity computing device 140 acts as end user device in which entity computing device 140 operates by receiving the image streams and/or sensor data as streamed by camera provider server 130(*a-n*) for viewing and/or analysis directly by the end user. Thus, entity computing device 140 may be operated by any entity that requests to view and/or analyze the image streams and/or sensor data as streamed by camera provider server 130(*a-n*) that will be apparent from those skilled in the relevant art(s) without departing from the spirit and scope of the present disclosure.

Examples of entity computing device 140 may include a mobile telephone, a smartphone, a workstation, a portable computing device, other computing devices such as a laptop, or a desktop computer, cluster of computers, set-top box, a server and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Image streaming device computing device 140 may provide access to the image streams as captured by cameras 110(*a-n*) and/or sensor data as captured by the sensors to entity computing device 140 via image streaming database 185. In doing so, entity computing device 140 may receive the image streams as captured by cameras 110(*a-n*) and/or sensor data as captured by the sensors as streamed by camera provider server 130(*a-n*) via image streaming database 185. For example, entity computing device 140 may digest the image streams and/or sensor data to then qualify and quantify potential risk and/or potential loss. Entity computing device 140 may also capture the image streams and/or sensor data to generate a tool set for auditing. In such an example, a consultant may determine the quantity of cameras 110(a-n) that are publicly available and thereby provide an availability scan of the image streams and/or sensor data as available based on the quantity of cameras 110(a-n) that are publicly available. Conventionally, BACNET data is available but such BACNET data is not providing any insight as to what conventional cameras are actually capturing the field of view with the image streams and so on. However, image streaming computing device 190 provides entity computing device 140 via image streaming database 185 specific information as to the field of view captured by each camera 110(a-n) rather than simply a list of publicly available cameras.

Image streaming computing device 190 may triangulate the data captured by the image streams and/or sensor data based on each camera 110(a-n) and/or sensor that captured the image streams and/or sensor data. For example, an event occurs at an energy substation in which the sound sensors immediately detect a shooting and the event of a shooting is identified. Cameras 110(a-n) positioned at the energy substation then track the activities that occur in the field of view of cameras 110(a-n). Cameras 110(a-n) may identify an individual in a red shirt that then enters a vehicle. Cameras 110(a-n) may then track the vehicles that exit on a road after the event and then additional cameras 110(a-n) positioned on the roadway may then track the vehicles that have left the roadway after the shooting. Entity computing device 140 may then determine where the vehicles are travelling based on the image streams captured by cameras 110(a-n). In such an example, entity computing device 140 may be a video management system and/or an analytics engine that then incorporates the image streams and/or sensor data to analyze the event in which entity computing device 140 has the data field to track the shooter based on the image streams and/or sensor data.

The image streams captured by cameras 110(a-n) may capture vehicular data in which the activities that occur in the operating environment of cameras 110(a-n) include vehicles that pass through the operating environment of cameras 110(a-n). In doing so, cameras 110(a-n) may capture vehicular data associated with each vehicle that passes through the field of view in the operating environment of cameras 110(a-n) via the image streams captured by cameras 110(a-n). Vehicular data may include the color of the vehicle, the speed of the vehicle, the direction of the vehicle, and/or any other characteristic associated with the vehicle that provides insight to the vehicle as captured by the image streams of cameras 110(a-n) that will be apparent from those skilled in the relevant art(s) without departing from the spirit and scope of the present disclosure.

However, image streaming computing device 190 may also generate a data stream of analytics by applying deep learning and/or artificial intelligence to the vehicular data captured by the image streams of cameras 110(a-n) that may track the vehicle across an entire highway as the vehicle passes through each field of view of the operating environment captured by each camera 110(a-n) positioned along the highway. For example, a child is abducted and camera 110a that is positioned in the operating environment in which the abductor abducts the child such that camera 110a captures the image stream of the abductor abducting the child. In doing so, camera 110a also captures the license plate of the vehicle in which the abductor departed the operating environment of camera 110a with the child. As the vehicle departs the operating environment of camera 110a, the vehicle then passes through the operating environment of camera 110b and camera 110b captures image streams of the vehicle. The vehicle then departs the operating environment of camera 110b and then passes through the operating environment of camera 110c and camera 110c captures the image streams of the vehicle and so on as the vehicle travels along the roadways and is captured by cameras 110(a-n) positioned along the roadways.

In doing so, the abductor is tracked throughout the entire process of abducting the child and then fleeing in the vehicle and tracked along the roadways that the vehicle travels. The data captured by the image streams of cameras 110(a-n) may then be stitched together and provided to the police so that the police may then track the abductor. In such an example, police may identify exactly where the abductor is within minutes of the abduction rather than an hour or greater after the abduction and the location of the abductor and the child is unknown. Rather the event takes place. The event is identified. A radius around the location of the event is determined. Cameras 110(a-n) positioned within the radius around the location may be identified by image streaming computing device 190. Image streaming computing device 190 via image streaming database 185 may then partition the cameras 110(a-n) positioned within the radius around the location of the event to target the image streams captured by such cameras 110(a-n). The vehicular data of the vehicle is captured by camera 110(a-n) positioned at the location of the event. Image streaming computing device 190 may then apply artificial intelligence to the image streams captured by cameras 110(a-n) positioned within the radius around the location of the event based on the vehicular data captured of the vehicle. The vehicle of the abductor may then be pinpointed within the radius around the location of the event based on the amount of time that has lapsed since the event and the distance that the vehicle could possibly travel in such duration of time.

In an embodiment, the data generated from the image streams captured by cameras 110(a-n) may be ingested to correlate to a problem of the entity that is requesting to analyze the problem and generate a solution based on the data generated from image streams captured by cameras 110(a-n). In such an embodiment, entity computing device 140 acts as middleware in which entity computing device 140 operates by receiving image streams and/or sensor data as streamed by camera provider server 130(a-n) and executes data analytics on the image stream and/or sensor data to provide data analysis to the customer of the entity. As a result, the entity that operates entity computing device 140 requests the data generated from the image streams captured by cameras 110(a-n) and/or sensor data to solve a problem of the customer via data analytics. The entity computing device 140 operating as middleware is missing the data generated from the image streams captured by cameras 110(a-n) and/or the sensor data captured by the sensors to adequately solve the problem of the customer via data analytics. However, image streaming computing device 190 may provide such missing data by entity computing device 140 and provide the data from the image streams captured by cameras 110(a-n) and/or sensor data captured by the sensors to entity computing device 140 such that entity computing device 140 may then adequately solve the problem of the customer via data analytics.

For example, a customer of the entity is a logistics center and the logistics center requests to know the chain of custody of shipments along the route taken by the shipping vehicles. In doing so, image streaming computing device 190 may be part of the chain of custody of the shipment as image streaming computing device 190 may provide to entity computing device 140 that is acting as middleware the image streams captured of the shipping vehicle by cameras 110(*a-n*) positioned along the route of the shipping vehicle to ensure that the shipping vehicle safely transported the shipment. Entity computing device 140 may then generate the data analytics for the logistics company based on the image streams captured of the shipping vehicle by cameras 110(*a-n*) to ensure the success of the transaction in transporting the shipment.

In such an example, entity computing device 140 may provide the data analytics to forensically investigate whether a license plate crossed an operating environment of camera 110(*a-n*) as captured by the image stream of camera 110(*a-n*) at a specified time as was documented. In order to do that, entity computing device 140 may require a consistent data set. Image streaming computing device 190 may provide via image streaming database 185 a curated library of publicly available, non-publicly available, IP address libraries and so on for the forensic video fabric executed by entity computing device 140. Conventionally, entity computing device 140 is limited to engaging Iowa.gov directly to receive the image streams as streamed by camera provider server 130 (*a-n*) for Iowa.gov in which the publicly available cameras 110(*a-n*) positioned along the roadways of Iowa may change in a week thereby tainting the data needed by entity computing device 140 to generate the forensics investigation report. Rather, image streaming computing device 190 may provide the necessary data via image streaming database 185 which is maintained and updated such that entity computing device 140 may rely on that data as the command center of the forensic investigation suite in which a reliable concierge of data may be provided.

Image streaming computing device 190 may scrape each plurality of cameras 110(*a-n*) associated with each camera 110(*a-n*) from a corresponding camera provider server 130 (*a-n*) that stores each plurality of camera parameters associated with each camera 110(*a-n*) as each plurality of camera parameters for each camera 110(*a-n*) is updated in each corresponding camera provider server 130(*a-n*). Each plurality of camera parameters provide access to each plurality of image streams captured by each corresponding camera 110(*a-n*) as streamed from each corresponding camera provider server 130(*a-n*). As discussed above, each plurality of cameras 110(*a-n*) may be associated with a camera provider server 130(*a-n*). For example, cameras 110*a* may be associated with camera provider server 130*a*. Cameras 110*b* may be associated with camera provider server 130*b*. Cameras 110*n* may be associated with camera provider server 130*n*.

As a result, each camera provider server 130(*a-n*) may stream the image streams captured by corresponding cameras 110(*a-n*). In such an example camera provider server 130*a* may stream the image streams captured by cameras 110*a*. Camera provider server 130*b* may stream the image streams captured by cameras 110*b*. Camera provider server 130*c* may stream the image streams captured by cameras 110*n*. However, each camera provider server 130(*a-n*) may stream the images captured by corresponding cameras 110 (*a-n*) in a different format. For example, camera provider server 130*a* may be associated with Alaska and may stream image streams of all the cameras 110*a* positioned along roadways in Alaska. Camera provider server 130*a* may then stream the image streams via user interface 120*a* which is a website in which the location of each camera 110*a* is provided via longitude and latitude of each camera 110*a* and the identification of each camera 110*a* may be provided in a first portion of the website. The name of the roads in which each camera 110*a* are positioned as well as the URL that provides the actual stream of images captured by each camera 110*a* may be provided in a second portion of the website. The multidirectional information as to the direction that each camera 110*a* is facing may be provided in a third portion of the website.

However, camera provider server 130*b* may be associated with Georgia and may stream images of all cameras 110*b* positioned along roadways in Georgia. Camera provider server 130*b* may then stream the image streams via user interface 120*b* which is a website that provides different information and in a different format and in different portions of the website than Alaska. Thus, each camera provider server 130(*a-n*) for each state streams the image streams in a different format resulting in fifty different formats.

Entity computing device 140 may attempt to access the image streams as streamed by each different camera provider server 130(*a-n*). However, entity computing device 140 would have to interface with each different camera provider server 130(*a-n*) in a manner to adapt to each different format in which each different camera provider server 130(*a-n*) streams the image streams. For example, entity computing device 140 would have to interface with fifty different camera provider servers 130(*a-n*) in a manner to adapt to each different format in which each different camera provider server 130(*a-n*) for each state that streams the image streams of cameras 110(*a-n*) positioned along the roadways in a different format in order to gain access to the image streams captured cameras 110(*a-n*) positioned along the roadways of all fifty states.

As a result, the resources required for entity computing device 140 to simply gain access to the image streams captured by cameras 110(*a-n*) as streamed in different formats by each camera provider server 130(*a-n*) may be significant in the increase in cost to have entity computing device 140 to interface in a manner to adapt to each different format in which each different camera provider server 130(*a-n*) streams the image streams as well as time to do so and so on. Further, entity computing device 140 may request to interface with numerous different camera provider servers 130(*a-n*) that is not a finite amount, such as fifty states. Rather, entity computing device 140 may request to continue to gain access to image streams streamed by different camera provider servers 130(*a-n*) which just continues to increase to scale. For example, entity computing device 140 may request to gain access to not only cameras 110(*a-n*) positioned along the roadways of all fifty states but also non-public cameras 110(*a-n*) positioned at facilities throughout the world and so on. Entity computing device 140 attempting to access such numerous different streams of image streams as streamed by numerous different camera provider servers 130(*a-n*) with each streaming in a different format may not be feasible for entity computing device 140.

Rather, image streaming computing device 190 may centralize the numerous image streams as streamed by numerous different camera provider servers 130(*a-n*) in numerous different formats into image streaming database 185. In doing so, image streaming computing device 190 may transform the numerous different formats into a single format that is then stored in image streaming database 185. Entity computing device 140 may then access the image streams via image streaming database 185 as streamed by camera provider servers 130(*a-n*). Rather than having to adapt to each of the numerous different formats of image streams for each camera provider server 130(*a-n*), entity computing device 140 simply has to adapt to a single format of image streams and then access the numerous different image streams via image streaming database 185.

For example, entity computing device 140 may access the image streams as streamed by camera provider server 130a for Florida by simply accessing the single format as provided in image streaming database 185. Entity computing device 140 may then access all of the image streams of the roadways in Florida as streamed by camera provider server 130a via the single format as stored in image streaming database 185. Entity computing device 140 may access the image streams as streamed by camera provider server 130b for Ohio by simply accessing the single format as provided in image streaming database 185. Entity computing device may then access all of the image streams of the roadways in Ohio as streamed by camera provider server 130b via the single format as stored in image streaming database 185 as opposed to having to adapt to the format of camera provider server 130a for Florida and the format of camera provider server 130b for Ohio.

As a result, image streaming computing device 190 may enable entity computing device 140 to continue to increase to scale the image streams captured by cameras 110(a-n) that entity computing device 140 requests to access. Image streaming computing device 190 simply scrapes each additional camera provider server 130(a-n) for additional image streams as captured by additional cameras 110(a-n) as streamed by each additional camera provider server 130(a-n). In doing so, image streaming computing device 190 converts each different format in which each additional camera provider server 130(a-n) streams the image streams to the single format that is stored in image streaming database 185. Entity computing device 140 may then access the additional image streams as captured by additional cameras 110(a-n) and streamed by additional cameral provider servers 130(a-n) via the single format as entity computing device 140 accesses all of the other image streams as streamed by camera provider servers 130(a-n) via image streaming database 185.

As discussed above, entity computing device 140 may request to increase to scale the image streams captured by cameras 110(a-n) that entity computing device 140 requests to access. As long as image streams as streamed by numerous camera provider servers 130(a-n) are accessible to entity computing device 140 based on the single format as stored in image streaming database 185, entity computing device 140 may have access to such image streams as streamed by numerous camera provider servers 130(a-n). For example, entity computing device 140 may operate as middleware by an operator that is an international logistics company that has logistics assets all over the world that travel not only on public roadways but also within private areas, such as business campuses, warehouse campuses, docks and so on. In such an example entity computing device 140 may request access to the image streams captured by not only public cameras 110(a-n) positioned internationally but also private cameras 110(a-n) positioned within private areas internationally. Unless such image streams as streamed by numerous camera provider servers 130(a-n) in different formats are converted into the single format by image streaming computing device 190 and stored in image streaming database 185 for access to entity computing device 140, entity computing device 140 simply does not have access to the image streams.

However, image streaming computing device 190 may also enable entity computing device 140 to decrease to scale the image streams captured by specific cameras 110(a-n) that entity computing device 140 requests to access. In doing so, image streaming computing device 190 may partition the image streams captured by specific cameras 110(a-n) as stored in the single format in image streaming database 185 and thereby provide access to the partition of image streams captured by specific cameras 110(a-n) to entity computing device 140. For example, entity computing device 140 operating as middleware by the operator that is the international logistics company requests access to image streams of specific cameras 110(a-n) positioned on a specific route within a specific radius of a location to analyze the image streams for a specific truck of the logistics company that was supposed to be travelling along the specific route. Rather than have to sift through numerous image streams as captured by numerous cameras 110(a-n) positioned internationally and provided access to such image streams as streamed by numerous camera provider servers 130(a-n) via image streaming database 185, image streaming computing device 190 may partition the image streams to the specific image streams as requested by entity computing device 140. In doing so, entity computing device 140 may compartmentalize the data analytics of the specific image streams as captured by specific cameras 110(a-n) positioned along the specific route and specific radius of a location as requested by entity computing device 140.

Thus, image streaming computing device 190 may provide access to entity computing device 140 any image stream captured by any camera 110(a-n) whether publicly available and/or privately available that image streaming computing device 190 may have access to scrape each corresponding camera provider server 130(a-n) for camera parameters associated with each camera 110(a-n). As noted above, camera provider server 130(a-n) may scrape camera parameters associated with each camera 110(a-n) from a corresponding camera provider server 130(a-n) as the camera parameters are updated in each corresponding camera provider server 130(a-n).

Camera parameters provide an identification as to each camera 110(a-n) that is capturing image streams as streamed by camera provider server 130(a-n) thereby enabling access to the image streams as streamed by camera provider server 130(a-n) for each camera 110(a-n). In doing so, camera parameters enable image streaming computing device 190 to identify which camera 110(a-n) is capturing each image stream as streamed by camera provider server 130(a-n). Camera parameters are unique to each camera 110(a-n) thereby enabling image streaming computing device 190 to differentiate which image streams as streamed by camera provider server 130(a-n) are captured by each camera 110(a-n). For example, a first camera 110(a-n) that is capturing image streams that are streamed by camera provider server 130(a-n) has different camera parameters then a second camera 110(a-n) that is capturing image streams that are streamed by camera provider server 130(a-n) thereby enabling image streaming device 190 to differentiate between the image streams captured by first camera 110(a-n) and second camera 110(a-n).

For example, camera parameters for each camera 110(a-n) as provided by camera provider server 130(a-n) may include identifiers unique to each camera 110(a-n) in the longitude and latitude for where each camera 110(a-n). Each camera 110(a-n) may have a different longitude and latitude based on where each camera 110(a-n) is positioned. Camera provider server 130(a-n) may designate a unique identifier for each camera 110(a-n) such that each camera 110(a-n) has a different identifier identifying each camera 110(a-n). Camera provider server 130(a-n) may provide the name of the road that each camera 110(a-n) is positioned. Camera provider server 130(a-n) may provide the direction that each camera 110(a-n) is facing on the roadway, such as facing north, facing east, facing west, and so on. Camera parameters may include any type of identifier unique to each camera 110(*a-n*) such that image streaming computing device 190 may differentiate between the image streams captured by each camera 110(*a-n*) as streamed by camera provider server 130(*a-n*) that will be apparent from those skilled in the relevant art(s) without departing from the spirit and scope of the present disclosure.

Image streaming computing device 190 may also scrape the camera parameter of the streaming identifier for each camera 110(*a-n*) which is how camera provider server 130(*a-n*) is actually streaming the image streams as captured by each camera 110(*a-n*). As discussed above, camera provider server 130(*a-n*) may actually stream each image stream for each camera 110(*a-n*) directly from camera provider server 130(*a-n*) and/or via a user interface 120(*a-n*) such as a website. The streaming identifier for each camera 110(*a-n*) is the mechanism in which camera provider server 130(*a-n*) actually streams each image stream for each camera 110(*a-n*).

For example, camera provider server 130(*a-n*) may stream each image stream for each camera 110(*a-n*) via a URL that is located on the website for camera provider server 130(*a-n*). In doing so, each camera 110(*a-n*) has a different URL such that each URL when accessed then streams the image stream captured by each camera 110(*a-n*). Image streaming device 190 may also determine whether each URL for each camera 110(*a-n*) is a video URL in which such cameras 110(*a-n*) are capturing video streams or a JPEG URL in which such cameras 110(*a-n*) are capturing static images. The camera parameter of the streaming identifier may be a URL transmission of the image streams, 4G transmission of the image streams, 5G transmission of the image streams, LAN transmission of the image streams, Point to Point transmission of the image streams and/or any other transmission of image streams by camera provider server 130(*a-n*) that will be apparent from those skilled in the relevant art(s) without departing from the spirit and scope of the present disclosure.

Image streaming computing device 190 may store each plurality of camera parameters associated with each corresponding camera 110(*a-n*) scraped from each corresponding server 130(*a-n*) in an image streaming database 185 thereby linking the plurality of camera parameters associated with each corresponding camera 110(*a-n*) scraped from each corresponding server 130(*a-n*) to the plurality of camera parameters associated with each corresponding camera 110 (*a-n*) as stored in image streaming database 190. The camera parameters for each camera 110(*a-n*) as provided by camera provider server 130(*a-n*) as scraped by image streaming computing device 190 from camera provider server 130(*a-n*) may then be mapped by image streaming computing device 190 to image streaming database 185.

Image streaming computing device 190 may link the camera parameters for each camera 110(*a-n*) as stored in image streaming database 185 to the camera parameters for each camera 110(*a-n*) as provided by camera provider server 130(*a-n*). In doing so, each image stream as captured by each camera 110(*a-n*) as streamed by camera provider server 130(*a-n*) may be accessed via image streaming database 185. Image streaming computing device 190 does not stream the image streams captured by each camera 110(*a-n*). Rather, image streaming computing device 190 provides access to the image streams as streamed by camera provider server 130(*a-n*) via image streaming database 185 based on the mapping of the camera providers of each camera 110 (*a-n*) as provided by camera provider server 130(*a-n*) to image streaming database 185.

For example, the URL of each image stream as captured by each camera 110(*a-n*) as provided by camera provider server 130(*a-n*) may be mapped by image streaming computing device 190 to image streaming database 185. In doing so, image streaming computing device 190 may link the URL for each image stream as stored in image streaming database 185 to the URL for each image stream as streamed by camera provider server 130(*a-n*). In doing so, each image stream as streamed by camera provider server 130(*a-n*) may be accessed via image streaming database 185 based on the URL for each image stream as stored in image streaming database 185. As a result, entity computing device 140 may access each image stream as streamed by camera provider server 130(*a-n*) via image streaming database 185.

Image streaming computing device 190 may transform each plurality of camera parameters associated with each camera 110(*a-n*) as scraped from each corresponding camera provider server 130(*a-n*) into a unique identifier for each camera as thereby stored in image streaming database 185. The unique identifier when accessed via image streaming database 185 may enable access to each image stream captured by each camera 110(*a-n*) as streamed from each corresponding camera provider server 130(*a-n*). As discussed in detail above, each camera provider server 130(*a-n*) may provide the camera parameters for each camera 110(*a-n*) associated with each camera provider server 130(*a-n*) in a different format than other camera provider servers 130 (*a-n*). As a result, image streaming device 190 may engage numerous different formats for the camera parameters as provided by numerous different camera provider servers 130(*a-n*).

Rather than have entity computing device 140 have to engage numerous different formats for the camera parameters in order to access the image streams as streamed by numerous different camera provider servers 130(*a-n*), image streaming computing device 190 may transform the numerous different formats for the camera parameters into a unique identifier that is then stored in image streaming database 185. Each unique identifier that provides the camera parameters for each camera 110(*a-n*) may be a single format in which each of the unique identifiers stored in image streaming database 185 may be the same single format. In doing so, entity computing device 140 may then access each image stream as streamed by numerous camera provider servers 130(*a-n*) each of which having different formats by simply accessing the unique identifiers of the same single format as stored in image streaming database 185.

The unique identifier provides the access to each image stream as streamed by camera provider server 130(*a-n*) based on the camera parameters incorporated into the unique identifier. For example, the unique identifier may be a URL that is associated with the image stream as streamed by camera provider server 130(*a-n*) as captured by a specific camera 110(*a-n*). The URL when accessed via image streaming database 185 may then provide access to the image stream as streamed by camera provider server 130(*a-n*) as captured by the specific camera 110(*a-n*). As discussed above, image streaming computing device 190 may transform the URL as provided by camera provider server 130(*a-n*) into a URL that is of a single format such that each of the URLs stored in image streaming database 185 are of the same single format.

As discussed above, image streaming computing device 190 does not download cameras 110(*a-n*) from camera provider server 130(*a-n*) such that image streaming computing device 190 then streams the image streams when accessed. Rather, image streaming computing device 190 enables access to the image streams via image streaming database 185 in which the image streams are streamed from camera provider server 130(*a-n*) instead of image streaming computing device 190. The unique identifier for each image stream as streamed by camera provider server 130(*a-n*) provides the access to each image stream via image streaming database 185. For example, accessing each image stream via the unique identifier for the image streams as stored in image streaming database 185 for image streams by the Ohio website is the same as accessing the image streams directly from the Ohio website.

The unique identifier and associated camera parameters as stored in image streaming database 185 enables image streaming computing device 190 to identify the camera 110(*a-n*) associated with the unique identifier. Image streaming computing device 190 may then ping camera provider server 130(*a-n*) for the information of the camera 110(*a-n*) that is associated with the unique identifier. Camera provider server 130(*a-n*) then instructs image streaming computing device 190 as to the URL that image streaming computing device 190 is to access as provided by camera provider server 130(*a-n*). The image stream associated with the unique identifier as stored in image streaming database 185 may then be accessed as streamed by camera provider server 130(*a-n*).

Image streaming computing device 190 may provide each image stream captured by each camera as streamed from each corresponding camera provider server 130(*a-n*) based on the unique identifier stored in image streaming database 185 that when accessed enables each image stream captured by each camera 110(*a-n*) to be streamed from each corresponding camera provider server 130(*a-n*) via image streaming database 185. As discussed above, entity computing device 140 simply has to access the unique identifier as stored in image streaming database 185 and then entity computing device 140 may access the image stream associated with the unique identifier as streamed by camera provider server 130(*a-n*). As camera provider server 130(*a-n*) updates the image streams and/or camera parameters associated with cameras 110(*a-n*), image streaming computing device 190 may capture such updates via the scrapes of camera provider server 130(*a-n*) and update the corresponding unique identifiers, accordingly. Thus, entity computing device 140 may access the updated image streams and so on as updated by camera provider server 130(*a-n*).

Figure 2:
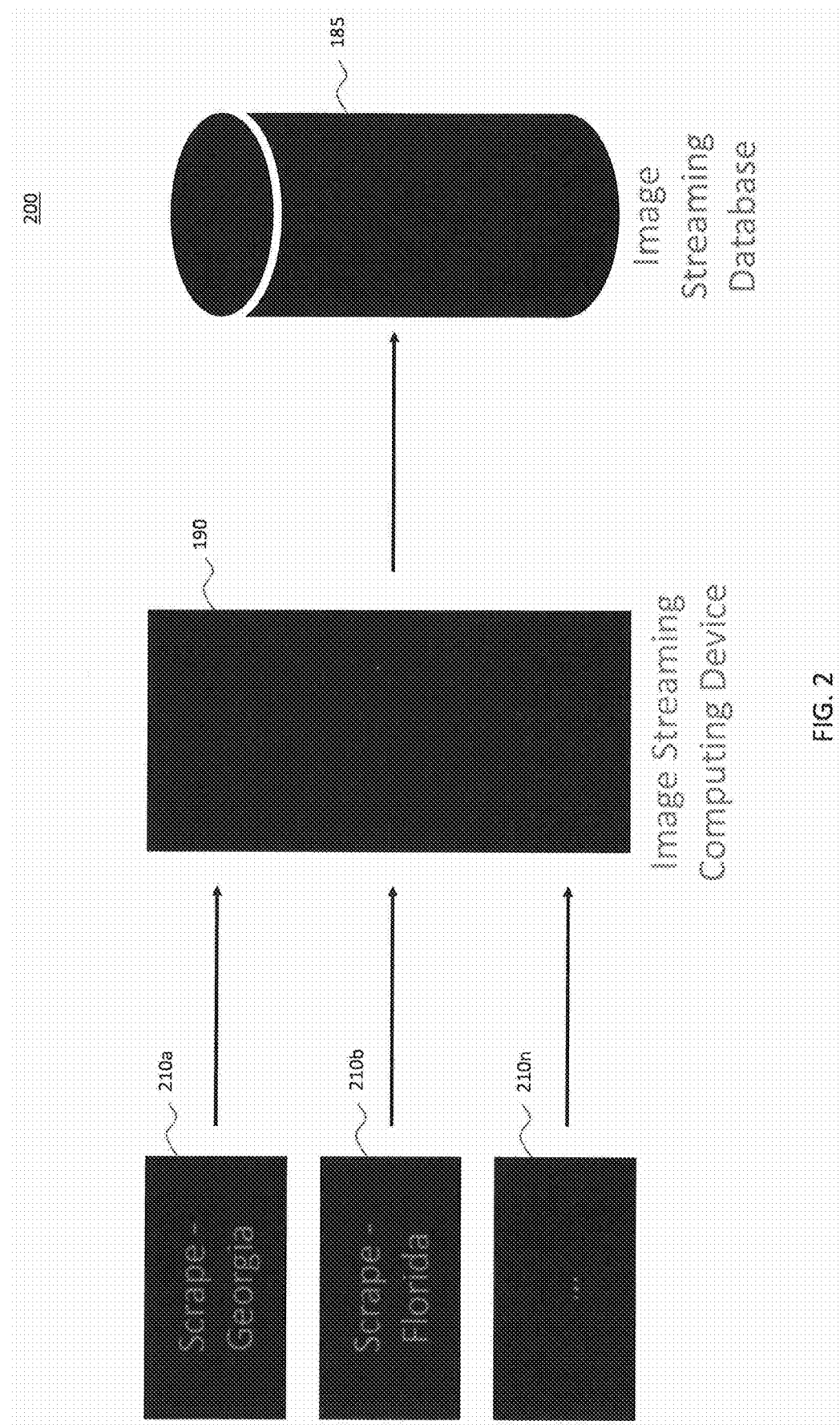
FIG. 2 depicts an illustration of a scraping configuration for scraping image streams from different states.

FIG. 2 depicts a scraping configuration 200 for scraping image streams from different states. Image streaming computing device 190 scrapes each of the different camera provider servers 210(*a-n*) for each state and then stores the unique identifiers generated for each image stream in image streaming database 185. Scraping the data from different camera providers may vary in complexity based on the formats of the camera providers as provided by the different camera providers thereby generating the need to scrape the camera parameters. Image streaming computing device 190 may customize each scrape for each camera provider to read the camera parameters and format to store in image streaming database 185. Image streaming computing device 190 may then address updating cameras 110(*a-n*) in image streaming database 185 and identifying any errors in the scrape. Scrapes may be run by image streaming computing device 190 at any time.

Image Stream Recognition

Conventional camera databases fail due to such conventional camera databases accumulating dead cameras. The camera links included in such conventional camera databases accumulate to such an increase in scale that such dead cameras cannot be conventionally removed from such conventional databases thereby contaminating the data generated from the image streams that are accessed via the conventional databases. Such contaminated data is critical when the entity is modeling for potential threats in which the entity is attempting to identify what the outcome is and then go back to how the outcome was triggered. In executing such modeling, the entity requires to identify which camera is being used in the analysis, what software is ingesting the data from the camera, what is the compute, how is the data being positioned, identifying critical to non-critical data, and to ensure there is low level of false alarms and false positives. The entity having access to clean data as provided the image streams is data that may be used immediately.

Such conventional camera databases accumulate dead cameras to such an increase in scale that conventional camera databases are unable to remove the dead cameras. The conventional camera databases continue to accumulate more and more cameras but fail to remove the dead cameras such that the entities that access such conventional camera databases grow frustrated in the increased quantity of dead cameras that are not providing image streams. The dead camera is a camera that is deactivated such that the dead camera is no longer providing an image signal. The dead camera is also a camera that is activated and providing an image signal but the dead camera is malfunctioning in that the dead camera is not capturing an image stream. Rather, the dead camera is providing a blank screen, a black screen, a blue screen, a screen that displays "image not found" and so on. Such dead cameras are activated and providing a signal but are not capturing any useful image streams. Conventional camera databases fail to identify the dead cameras that are activated by failing to capture an image stream and remove such dead cameras from the conventional camera database.

Returning to FIG. 1, image streaming computing device 190 may implement image streaming server 150 and neural network 105 to analyze the image streams captured by cameras 110(*a-n*) as streamed by camera provider server 130(*a-n*) to determine whether the image streams are active image streams of the operating environment of cameras 110(*a-n*). Image streams which fail to actively capture the operating environment of cameras 110(*a-n*) but rather are dead image streams that are depicting a blank screen, black screen, blue screen, "image not found", and so on may be removed from image streaming database 185 by image streaming computing device 190. Dead image streams are image streams that fail to provide an active capture of the operating environment of cameras but rather provide a screen with no image data. For the case of simplicity, dead image streams will be referred to as capturing image streams with no image data but rather an activated camera that is returning a blank screen, black screen, "image not found", and so on throughout the remaining specification. Thus, image streaming computing device 190 may remove access to cameras 110(*a-n*) that are capturing dead image streams as streamed by camera provider server 130(*a-n*) from image streaming database 185 thereby preventing any access to such dead image streams Further, each camera provider server 130(*a-n*) may have cameras 110(*a-n*) that depict dead image streams differently. For example, camera provider server 130*a* may have cameras 110(*a-n*) that depict dead image streams with an "image not found" labeled on the dead image stream. Camera provider server 130*b* may have cameras 110(*a-n*) that depict dead image streams that are black screen. As a result, camera provider servers 130(*a-n*) do not have a universal depiction of dead image streams. Thus, image streaming computing device 190 may implement image streaming server 150 and neural network 105 to analyze the image streams recognize the different dead image streams such that image streaming computing device 190 may then remove access to cameras 110(*a-n*) that are providing the dead image streams from image streaming database 185. Image streaming computing device 190 may also implement image streaming server 150 and neural network 105 to analyze the image streams to recognize when the image streams captured by each camera 110(*a-n*) depict inclement weather as well as when the image streams captured by each camera 110(*a-n*) depict traffic congestion.

Thus, image streaming computing device 190 may implement image streaming server 150 and neural network to analyze the image streams to recognize an image parameter that is being depicted by the image streams. The image parameter depicted by the image streams is an event and/or condition of the operating environment of cameras 110(*a-n*) that is of interest to the entity. The image parameter may be of the operating environment of cameras 110(*a-n*) as captured by cameras 110(*a-n*) such as the weather conditions and/or traffic conditions. The image parameter may also be of the operation of cameras 110(*a-n*) themselves in the operating environment such as cameras 110(*a-n*) are depicting dead image streams. Image streaming computing device 190 may implement image streaming server 150 and neural network 105 to analyze the image streams to recognize any type of image parameter that may be depicted by the image streams that will be apparent to those skilled in the relevant art(s) without departing from the spirit and scope of the present disclosure.

Image streaming computing device 190 may continuously stream image data to image streaming server 150 such that image streaming server 150 may accumulate image data as stored in image streaming database 185. In doing so, image streaming server 150 may continuously accumulate image data that is associated with the image streams that are scraped by image streaming computing device 190 based on the camera parameters associated with numerous cameras 110(*a-n*) capturing image streams as streamed by numerous camera provider servers 130(*a-n*) and provided access to such image streams via image streaming database 185. The image data is accumulated from the pixels of each image stream and analyzed to recognize different image parameters that are depicted by each image stream. Over time as the image data is accumulated by image streaming server 150 continues to increase, neural network 105 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

Each time that image data is streamed to image streaming server 150, neural network 105 may then assist image streaming computing device 190 by providing image streaming computing device 190 with the appropriate recognition of the image parameter depicted by the image stream to automatically adjust the recognition of the image parameter by image streaming computing device 190 to correctly recognize the image parameter depicted by the image stream. Neural network 105 may assist image streaming computing device 190 in learning as to the appropriate image parameter depicted by the image stream based on the image data such that neural network 105 may further improve the accuracy of image streaming computing device 190 in automatically recognizing the appropriate image parameter depicted by the image stream to further enhance the analysis of the image stream. Neural network 105 may provide image streaming computing device 190 with improved accuracy in automatically recognizing the appropriate image parameter depicted in the image stream such that neural network 105 may continue to learn upon with the accumulation of image data that is provided by image streaming computing device 190 and/or any computing device associated with image streaming system 100 to image streaming server 150. Thus, recognition of image parameters depicted by image streams by entity computing device 140 may further enhance the data analytics executed by entity computing device 140 acting as middleware on the image streams and/or further enhance the recognition of such image parameters by entity computing device 140 acting as the end user device.

Image streaming computing device 190 may continuously stream sensor data to image streaming server 150 such that image streaming server 150 may accumulate sensor data as stored in image streaming database 185. In doing so, image streaming server 150 may continuously accumulate sensor data that is associated with the image streams that are scraped by image streaming computing device 190 based on the sensor data captured by the sensors associated with numerous cameras 110(*a-n*) capturing image streams as streamed by numerous camera provider servers 130(*a-n*) and provided access to such image streams via image streaming database 185. The sensor data is accumulated from the sensors positioned in the operating environment of each camera 110(*a-n*) capturing each image stream and analyzed to recognize different image parameters that are depicted by each image stream. Over time as the sensor data is accumulated by image streaming server 150 continues to increase, neural network 105 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

Each time that sensor data is streamed to image streaming server 150, neural network 105 may then assist image streaming computing device 190 by providing image streaming computing device 190 with the appropriate recognition of the image parameter depicted by the image stream to automatically adjust the recognition of the image parameter by image streaming computing device 190 to correctly recognize the image parameter depicted by the image stream. Neural network 105 may assist image streaming computing device 190 in learning as to the appropriate image parameter depicted by the image stream based on the sensor data such that neural network 105 may further improve the accuracy of image streaming computing device 190 in automatically recognizing the appropriate image parameter depicted by the image stream to further enhance the analysis of the image stream. Neural network 105 may provide image streaming computing device 190 with improved accuracy in automatically recognizing the appropriate image parameter depicted in the image stream such that neural network 105 may continue to learn upon with the accumulation of sensor data that is provided by image streaming computing device 190 and/or any computing device associated with image streaming system 100 to image streaming server 150. Thus, recognition of image parameters depicted by image streams by entity computing device 140 may further enhance the data analytics executed by entity computing device 140 acting as middleware on the image streams and/or further enhance the recognition of such image parameters by entity computing device 140 acting as the end user device.

Image streaming server 150 includes a processor, a memory, and a network interface, herein after referred to as a computing device or simply "computer". For example, image streaming server 150 may include a data information system, data management system, web server, and/or file transfer server. Image streaming server 150 may also be a workstation, mobile device, computer, cluster of computers, set-top box, a cloud server or other computing device.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

Image streaming computing device 190 may analyze a plurality of pixels included in each image stream captured by each camera 110(*a-n*) as streamed by corresponding camera provider server 130(*a-n*) to determine whether the plurality of pixels exceed a pixel threshold. The pixel threshold when exceeded is indicative of an image parameter that corresponding camera 110(*a-n*) is failing to capture an image stream. As discussed above, cameras 110(*a-n*) that fail to capture an image stream but are still activated in which such cameras 110(*a-n*) provide dead image streams. Such dead image streams may be a black screen, a blue screen, a blank screen, display "image not found."

The pixels included in each image stream captured by each camera 110(*a-n*) may be analyzed via image streaming computing device 190 to determine whether the pixels depict a dead image stream thereby indicating that corresponding camera 110(*a-n*) is failing to capture an image stream. The pixels included in the dead image stream have a significant increase in similarity as compared to the pixels included in the live image stream that is actually capturing the operating environment of camera 110(*a-n*). Each pixel included in the live image stream may have significant contrast as compared to the other pixels included in the live image stream in that a depiction of the operating environment as captured by camera 110(*a-n*) may have pixels with contrast such that contours of the operating environment and so on may be identified from the live image stream as captured by camera 110(*a-n*). However, pixels included in the dead image stream may have pixels of decreased contrast and increased similarity. For example, a dead image stream depicting a black screen may depict numerous black pixels and may fail to depict any pixels with color as the black screen is simply black without any contrast.

As a result, image streaming computing device 190 may analyze the pixels included in the image stream to determine whether the pixels exceed a pixel threshold. The pixel threshold when exceeded is indicative that the pixels included in the image stream have limited contrast if any thereby indicating the image stream is a dead image stream. The pixel threshold when less is indicative that the pixels included in the image stream have contrast thereby indicating that the image stream is a live image stream and actually depicting the operating environment captured by camera 110(*a-n*).

Image streaming computing device 190 may generate a histogram for the image stream to determine whether the pixels exceed the pixel threshold thereby indicating that the image stream is a dead image. Image streaming computing device 190 may recognize the pixels that have contrast as compared to the pixels that do not have contrast and generate a histogram that provides the quantity of pixels that have contrast as compared to the pixels that do not have contrast. Based on the histogram, image streaming computing device 190 may then determine whether image stream is dead image stream. For example, the image stream is depicting a blue color. Image streaming computing device 190 may then generate a histogram of the pixels included in the image stream. The histogram provides that the all of the pixels do not have contrast in that the pixels are blue. Thus, image streaming computing device 190 may then determine that the pixels of no contrast exceed the pixel threshold and recognize that the image stream displaying the blue screen is a dead image stream.

Image streaming computing device 190 may remove the unique identifier associated with each camera 110(*a-n*) that includes the plurality of pixels that exceed the pixel threshold from image streaming database 185 and is indicative of the image parameter that corresponding camera 110(*a-n*) is failing to capture the image stream thereby removing the camera parameters associated with each camera 110(*a-n*) as transformed into the unique identifier from image streaming database 185 to prevent each camera 110(*a-n*) that is failing to capture an image stream from being accessed in image streaming database 185. As discussed above, image streaming computing device 190 may transform the camera parameters for each camera 110(*a-n*) that is capturing the image stream and is streamed by camera provider server 130(*a-n*) into a unique identifier that is then stored in image streaming database 185 to provide access to the image stream.

However, unique identifiers stored in image streaming database 185 that are associated with cameras 110(*a-n*) that are providing dead image streams as streamed by camera provider server 130(*a-n*) are useless in image streaming database 185 and further taint analysis of the image streams. As a result, image streaming computing device 190 may remove the unique identifiers that are associated with cameras 110(*a-n*) that are providing dead image streams from image streaming database 185. In doing so, such dead image streams may no longer be accessed via image streaming database 185 thereby providing increased accuracy in analyzing the image streams as well as accessing the image streams due to the removal of access to the dead image streams from image streaming database 185.

Image streaming computing device 190 may continuously stream the image data associated with the image parameter that corresponding camera 110(*a-n*) is failing to capture an image stream s the image data associated with each image parameter that corresponding camera 110(*a-n*) is failing to capture the image stream are accumulated in image streaming database 185 to image streaming server 150 for neural network 105 to incorporate into the determination that each image parameter the corresponding camera 110(*a-n*) is failing to capture the image stream for additional image streams as past streamed image data. As discussed above, image streaming server 150 and neural network 105 may assist image streaming computing device 190 in recognizing that image streams are dead image streams. Each time that image streaming computing device 190 recognizes that the image stream is a dead image stream, the image data of the dead image stream may be provided to image streaming server 150 such that neural network 105 may associate such image data as identifying the image stream as the dead image stream. In doing so, image streaming server 150 and neural network 105 may assist image streaming computing device 190 in recognizing image data in future image streams as being dead image streams.

For example, the image stream is depicting "image not found" in a color and is positioned in the center of the image stream while the remaining image stream is black. The image data that of such an image stream may indicate that the majority of the pixels do not have contrast in that the pixels are black while a decreased number of pixels depict a color and those pixels are arranged in the center of the image stream in a manner that is indicative that such pixels with color are displaying letters. Image streaming server 150 and neural network may assist image streaming computing device 190 in recognizing that the pixels of no contrast exceed the pixel threshold while the pixels of contrast are arranged in the image stream in manner that indicates the pixels with contrast are displaying letters such that image streaming computing device 190 may recognize that the image stream displaying "image not found" is a dead image stream.

Image streaming computing device 190 may also track a vehicle based on the pixels included in the image stream in which image streaming computing device 190 may determine which pixels correspond to the pixel threshold and thereby identify and track the vehicle. For example, an entity may have trucks in which each truck is the color green and each truck is the same size. Each truck also have the same logo positioned in the same position as each other truck. Image streaming computing device 190 may then recognize the pixels that are positioned in the logo as contrasted depicting the logo as compared to the pixels that are positioned in the truck that are not contrasted as depicting the green truck. Image streaming computing device 190 may then determine that such pixel contrast as related to the position on each truck as well as compared to the pixel threshold for the position of the truck that pixels depicting the logo as compared to the rest of the truck that is green match the trucks of the entity.

Image streaming computing device 190 may analyze the plurality of pixels included in each image stream captured by each camera 110(*a-n*) as streamed by corresponding camera provider server 130(*a-n*) to determine whether the plurality of pixels exceeds a traffic congestion threshold. The traffic congestion threshold is indicative of an image parameter that the corresponding camera is capturing an image stream of congested traffic. As discussed above, cameras 110(*a-n*) may capture image streams that depict the traffic level of vehicles that travelling through the operating environment of cameras 110(*a-n*). Such traffic level may provide insight as to the traffic of the operating environment of cameras 110(*a-n*).

The pixels included in each image stream captured by each camera 110(*a-n*) may be analyzed via image streaming computing device 190 to determine whether the pixels depict vehicles travelling through the operating environment of each camera 110(*a-n*). The pixels that depict vehicles as compared to pixels that depict the operating environment of each camera 110(*a-n*) may have a pattern that differentiates the vehicles from the operating environment. Each pixel that depict the vehicle as compared to each pixel that depict the operating environment may have a differentiating pattern such as the contrast and so on to thereby enable the identification as to a vehicle is travelling through the operating environment.

As a result, image streaming computing device 190 may analyze the pixels included in the image stream to determine whether the pixels exceed a traffic congestion threshold. The traffic congestion threshold in which pixels identified in the image stream as depicting vehicles when exceeded is indicative that the pixels included in the image stream depict a quantity of vehicles relative to the operating environment of camera 110(*a-n*) thereby indicating that there is traffic congestion in the operating environment of camera 110(*a-n*). The pixels that depict the vehicles when less than the traffic congestion threshold is indicative that the pixels included in the image stream depict a quantity of vehicles relative to the operating environment of camera 110(*a-n*) thereby indicating that there is no traffic congestion in the operating environment of camera 110(*a-n*).

Image streaming computing device 190 may generate a histogram for the image stream to determine whether the pixels exceed the traffic congestion threshold thereby indicating there is traffic congestion in the operating environment of camera 110(*a-n*). Image streaming computing device 190 may recognize the pixels that depict the vehicles as compared to the pixels that depict the operating environment of camera 110(*a-n*) and generate a histogram that provides the quantity of pixels that depict the vehicles as compared to the pixels that depict the operating environment. Based on the histogram, image streaming computing device 190 may then determine whether there is traffic congestion in the operating environment of camera 110(*a-n*).

Image streaming computing device 190 may generate an alert associated with each unique identifier of each camera 110(*a-n*) that includes the plurality of pixels that exceed the traffic congestion threshold and is indicative of the image parameter that corresponding camera 110(*a-n*) is capturing of the image stream of congested traffic thereby associated with the camera parameters associated with each camera 110(*a-n*) as transformed into the unique identifier is capturing the image stream of congested traffic as stored in image streaming database 185. As discussed above, image streaming computing device 190 may transform the camera parameters for each camera 110(*a-n*) that is capturing the image stream and is streamed by camera provider server 130(*a-n*) into a unique identifier that is then stored in image streaming database 185 to provide access to the image stream. Entity computing device 140 may then determine whether traffic congestion is occurring the operating environment of each camera 110(*a-n*) based on the unique identifier of each camera 110(*a-n*) that is depicting traffic congestion.

Image streaming computing device 190 may continuously stream the image data that is associated with the image parameter that corresponding camera 110(*a-n*) is capturing the image stream of congested traffic as the image data associated with each image parameter that corresponding camera 110(*a-n*) is capturing the image stream of congested traffic are accumulated in image streaming database 185 to image streaming server 150 for neural network 105 to incorporate into the determination of each image parameter that corresponding camera 110(*a-n*) is capturing the image stream of congested traffic for additional image streams as past streamed image data. As discussed above, image streaming server 150 and neural network 105 may assist image streaming computing device 190 in recognizing that image streams that depict traffic congestion. Each time that image streaming computing device 190 recognizes that the image stream depicts traffic congestion, the image data of the dead image stream may be provided to image streaming server 150 such that neural network 105 may associate such image data as identifying traffic congestion. In doing so, image streaming server 150 and neural network 105 may assist image streaming computing device 190 in recognizing image data in future image streams as being traffic congestion.

Image streaming computing device 190 may analyze the plurality of pixels in each image stream captured by each camera as streamed by corresponding camera provider server 130(*a-n*) to determine whether the plurality of pixels exceed an inclement weather threshold. The inclement weather threshold is indicative of an image parameter that corresponding camera 110(*a-n*) is capturing an image stream of inclement weather. The pixels included in image stream depicting inclement weather may have a significant increase in similarity as compared to the pixels included in the image stream that is not depicting inclement weather in the operating environment of camera 110(*a-n*). Each pixel included in the image stream that is not depicting inclement weather may have significant contrast as compared to the other pixels included in the image stream in that a depiction of the operating environment as captured by camera 110(*a-n*) that does not have inclement weather may have pixels with contrast such that contours of the operating environment and so on may be identified from the image stream as captured by camera 110(*a-n*). However, pixels included in the image stream depicting inclement weather may have pixels of decreased contrast and increased similarity. For example, an image stream depicting a snow storm may depict numerous white pixels.

As a result, image streaming computing device 190 may analyze the pixels included in the image stream to determine whether the pixels exceed an inclement weather threshold. The inclement weather threshold when exceeded is indicative that the pixels included in the image stream have limited contrast if any thereby indicating the image stream depicting inclement weather. The inclement weather threshold when less is indicative that the pixels included in the image stream have contrast thereby indicating that the image stream not depicting inclement weather in the operating environment captured by camera 110(*a-n*).

Image streaming computing device 190 may generate a histogram for the image stream to determine whether the pixels exceed the inclement weather threshold thereby indicating that the image stream depicting inclement weather. Image streaming computing device 190 may recognize the pixels that have contrast as compared to the pixels that do not have contrast and generate a histogram that provides the quantity of pixels that have contrast as compared to the pixels that do not have contrast. Based on the histogram, image streaming computing device 190 may then determine whether image stream is depicting inclement weather. For example, the image stream is depicting a snow storm. Image streaming computing device 190 may then generate a histogram of the pixels included in the image stream. The histogram provides that the all of the pixels do not have contrast in that the pixels are white. Thus, image streaming computing device 190 may then determine that the pixels of no contrast exceed the inclement weathers threshold and recognize that the image stream displaying snow storm is inclement weather.

Image streaming computing device 190 may generate an alert associated with each unique identifier of each camera 110(*a-n*) that includes the plurality of pixels that exceed the inclement weather threshold and is indicative of the image parameter that corresponding camera 110(*a-n*) is capturing the image stream of inclement weather thereby associated with the camera parameters associated with each camera 110(*a-n*) as transformed into the unique identifier that the alert is indicative of the image parameter that corresponding camera is capturing the image stream of inclement weather as stored in image streaming database 185. As discussed above, image streaming computing device 190 may transform the camera parameters for each camera 110(*a-n*) that is capturing the image stream and is streamed by camera provider server 130(*a-n*) into a unique identifier that is then stored in image streaming database 185 to provide access to the image stream. Entity computing device 190 may then determine whether inclement weather is occurring in the operating environment of each camera 110(*a-n*) based on the unique identifier of each camera 110(*a-n*) that is depicting inclement weather.

Image streaming computing device 190 may continuously stream the image data is associated with the image parameter that corresponding camera 110(*a-n*) is capturing the image stream of inclement weather as the image data associated with each image parameter that corresponding camera 110(*a-n*) is capturing the image stream of inclement weather are accumulated in image streaming database 185 to image streaming server 150 for neural network 105 to incorporate into the determination of each image parameter that corresponding camera 110(*a-n*) is capturing the image stream of inclement weather for additional image streams as past streamed image data. As discussed above, image streaming server 150 and neural network 105 may assist image streaming computing device 190 in recognizing that image streams depict inclement weather. Each time that image streaming computing device 190 recognizes that the image stream depicts inclement weather, the image data of the image stream that depicts inclement weather may be provided to image streaming server 150 such that neural network 105 may associate such image data as identifying the image stream as depicting inclement weather. In doing so, image streaming server 150 and neural network 105 may assist image streaming computing device 190 in recognizing image data in future image streams as depicting inclement weather.

Image streaming computing device 190 may analyze the sensor data that is associated with each image stream captured by each camera 110(*a-n*) as streamed by corresponding camera provider server 130(*a-n*) to determine whether the sensor data exceeds the inclement weather threshold. As discussed above, sensors may be positioned in the operating environment of each camera 110(*a-n*). Such sensors may capture sensor data as temperature sensors, pavement temperature sensors, ambient temperature sensors, wind sensors, and so on. Image streaming computing device 190 may analyze this sensor data to determine if the sensor data exceeds the inclement weather threshold thereby indicating that inclement weather is occurring. For example, the wind sensors positioned in the operating environment of camera 110(*a-n*) may capture wind gusts that exceed the inclement weather threshold. Image computing device 190 may generate the alert associated with each unique identifier of each camera 110(*a-n*) that includes the sensor data that exceeds the inclement weather threshold and is indicative of the image parameter that corresponding camera 110(*a-n*) is capturing the image stream of inclement weather thereby associated with the camera parameters associated with each camera 110(*a-n*) as transformed into the unique identifier that is indicative of the image parameter that corresponding camera 110(*a-n*) is capturing the image stream of inclement weather as stored in image streaming database 185.

Figure 3:
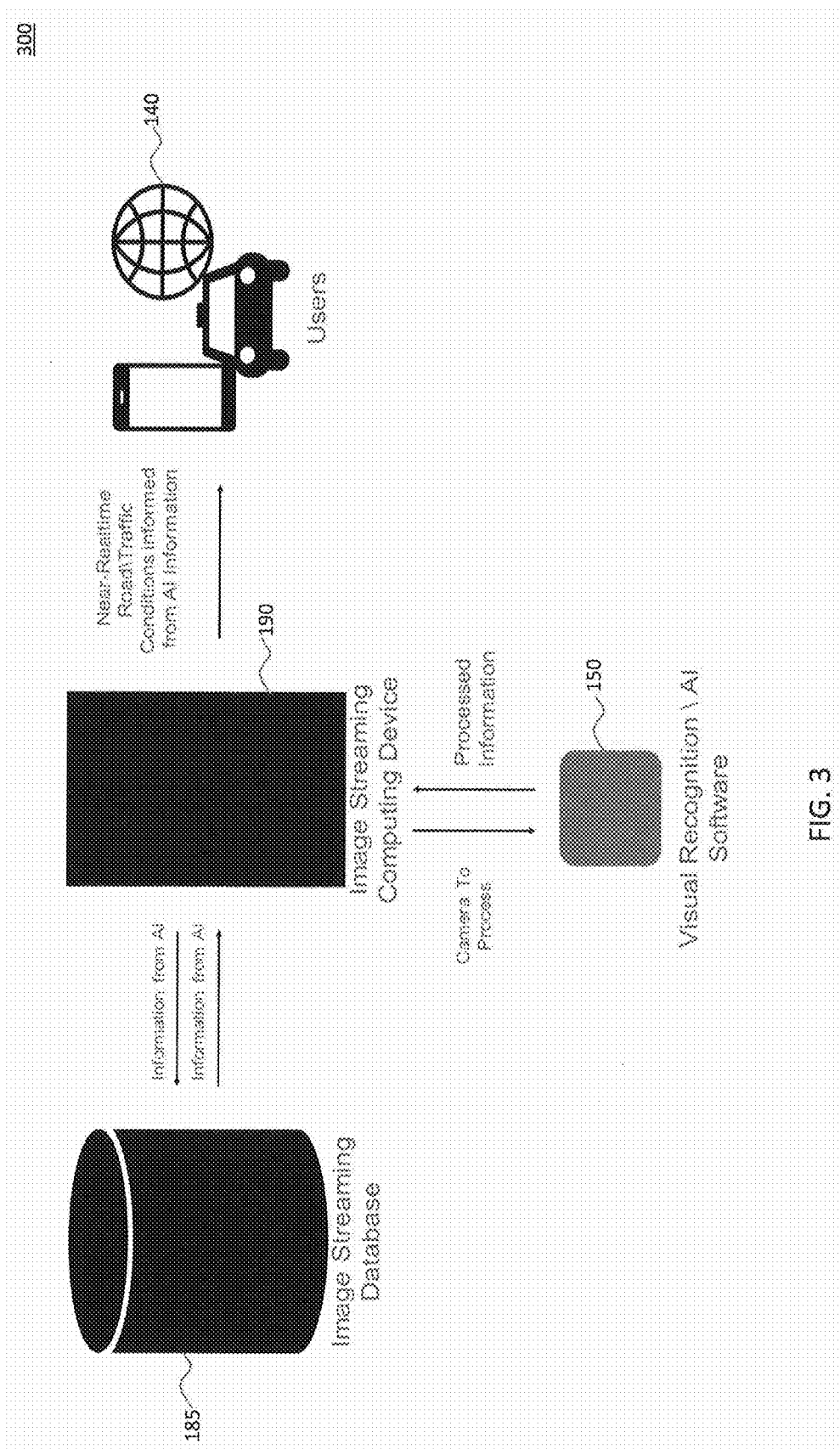
FIG. 3 depicts an illustration of an image recognition configuration for recognizing what is depicted by image streams.

FIG. 3 depicts an image recognition configuration 300 for recognizing what is depicted by image streams. Image streaming database 185 may provide information from artificial intelligence to image streaming computing device 190.

Figure 4:
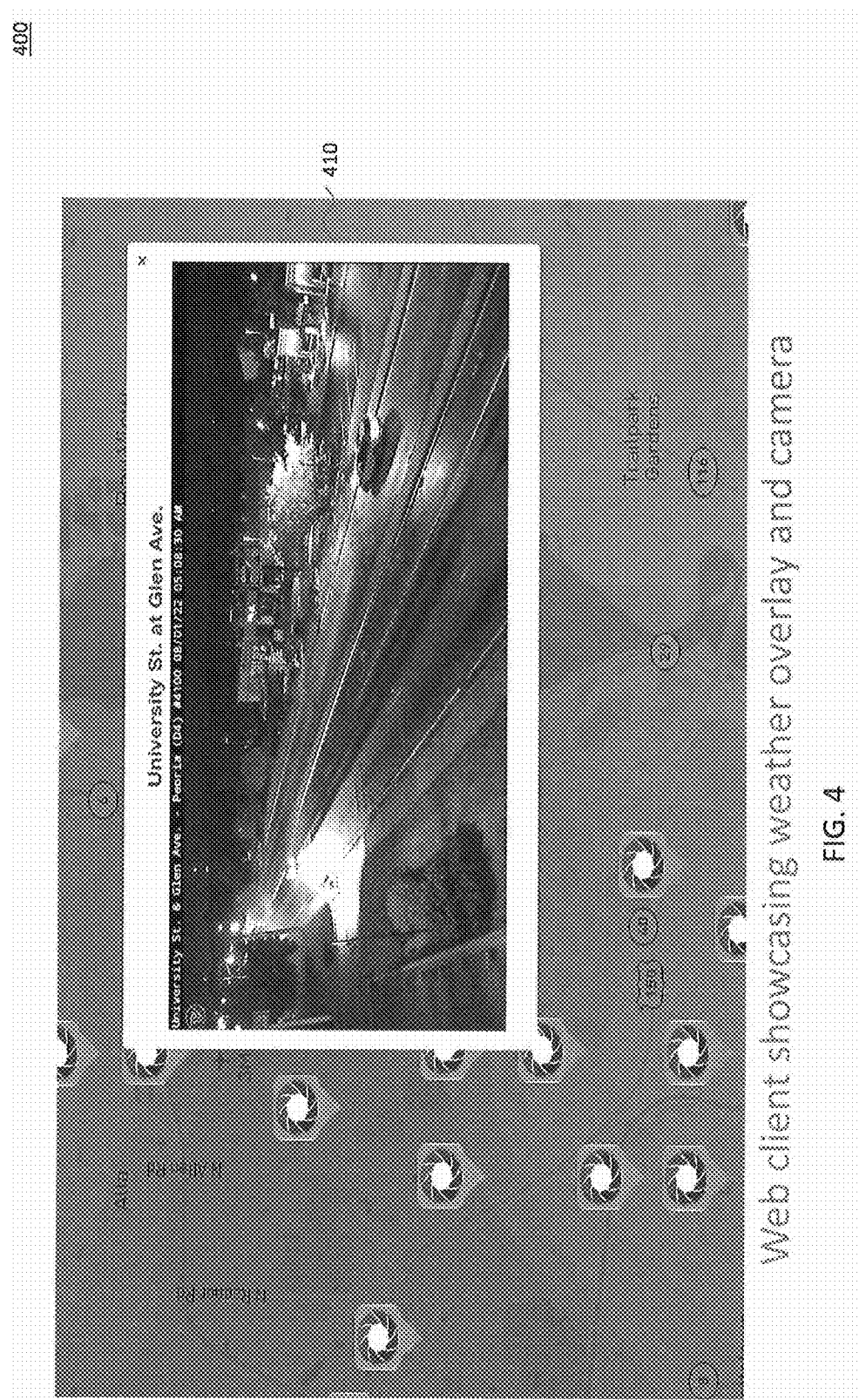
FIG. 4 depicts an illustration of a weather overlay configuration in which a weather overlay that depicts the image stream of camera that is capturing the weather in the operating environment of camera.

Image streaming computing device 190 may provide information from artificial intelligence to image streaming database 185. Image streaming computing device 190 may provide camera 110(a-n) to process to visual recognition/artificial intelligence software 150. Visual recognition/artificial intelligence software 150 may provide processed information to image streaming computing device 190. Image streaming computing device may provide road/traffic conditions informed from artificial intelligence information to users 140. Visual recognition/artificial intelligence software 150 may be given camera 110(a-n) to look at. Visual recognition/artificial intelligence software 150 may determine the status of camera 110(a-n) as well as road conditions. This information is sent back to user 140 as well as stored in image streaming database 185. FIG. 4 depicts a weather overlay configuration 400 in which a weather overlay 410 that depicts the image stream of camera 410(a-n) that is capturing the weather in the operating environment of camera 410(a-n).

Returning to FIG. 1, image streaming server 150 and neural network 105 may assist image streaming computing device 190 in determining route planning for the vehicle that is travelling along roadways for an entity. Image streaming computing device 190 may obtain road information from the camera parameters of cameras 110(a-n), the image streams captured by cameras 110(a-n) of the operating environment of cameras 110(a-n), as well as the sensor data captured from the sensors positioned in the operating environment of cameras 110(a-n). As the vehicle is travelling along the roadway, image streaming computing device 190 may determine the upcoming destination cameras 110(a-n) that the vehicle is approaching. Image streaming computing device 190 may then determine alternate routes based on the road information provided to image streaming computing device 190 in which image streaming computing device 190 may analyze turn by turn navigation based on road conditions.

In doing so, image streaming server 150 and neural network 105 may assist image streaming computing device 190 determine the alternate routes based on the road conditions. Rather than a traffic condition being identified visually, image streaming computing device 150 may determine the traffic condition before the vehicle approaches the alleged traffic condition. Conventionally, such visually identified traffic conditions may result in the traffic conditions being dissipated before the vehicle approaches the alleged traffic condition in which the vehicle may have then taken an alternate route, unnecessarily.

Based on the road information such as whether the operating environment captured by camera 110(a-n) has traffic congestion and/or the roadway is slick, image streaming server 150 and neural network 105 may assist image streaming computing device 190 in determining the route based on such road information. Conventionally, route planning is determined based on a score that identifies the shortest route between a departure and a destination. However, image streaming computing device 190 may impact that score based on the road information. For example, image streaming computing device 190 may determine that the weather of the operating environment of camera 110(a-n) is inclement and that may impact the score of the route such that image streaming computing device 190 determines an alternate route for the vehicle.

Image streaming computing device 190 may identify cameras 110(a-n) positioned along the route of the vehicle and may analyze the road information for the operating environments of such cameras 110(a-n) positioned along the route. Image streaming computing device 190 may then analyze the road information for cameras 110(a-n) in partitions in which image streaming computing device 190 may analyze the road information for cameras 110(a-n) as the vehicle approaches each partition. In doing so, image streaming computing device 190 may prevent analyze road information for cameras 110(a-n) positioned a significant duration of time from the vehicle in which such road information may have changed as the vehicle actually approaches cameras 110(a-n). For example, the road information for cameras 110(a-n) positioned five hours from the current destination of the vehicle may change by as the vehicle actually approaches such cameras 110(a-n) five hours later.

Image streaming computing device 190 may then provide the alternate routes based on score and rank such alternate routes in the alternate routes with the highest score may be presented relative to the alternate routes with lower scores. Image streaming server 150 and neural network 105 may then be trained based on the road information associated with such routes to assist image streaming computing device 190 in determining the routes. For example, a first route may be a route with a higher score in the snow because the route is flatter but such route may be a longer route between the departure and destination. As a result, a second route may be a route with a higher score when there is snow because the route has inclines and declines but may be a shorter route between the departure and destination. In doing so, image streaming server 150 and server 105 may be trained on such road information in determining routes.

Figure 5:
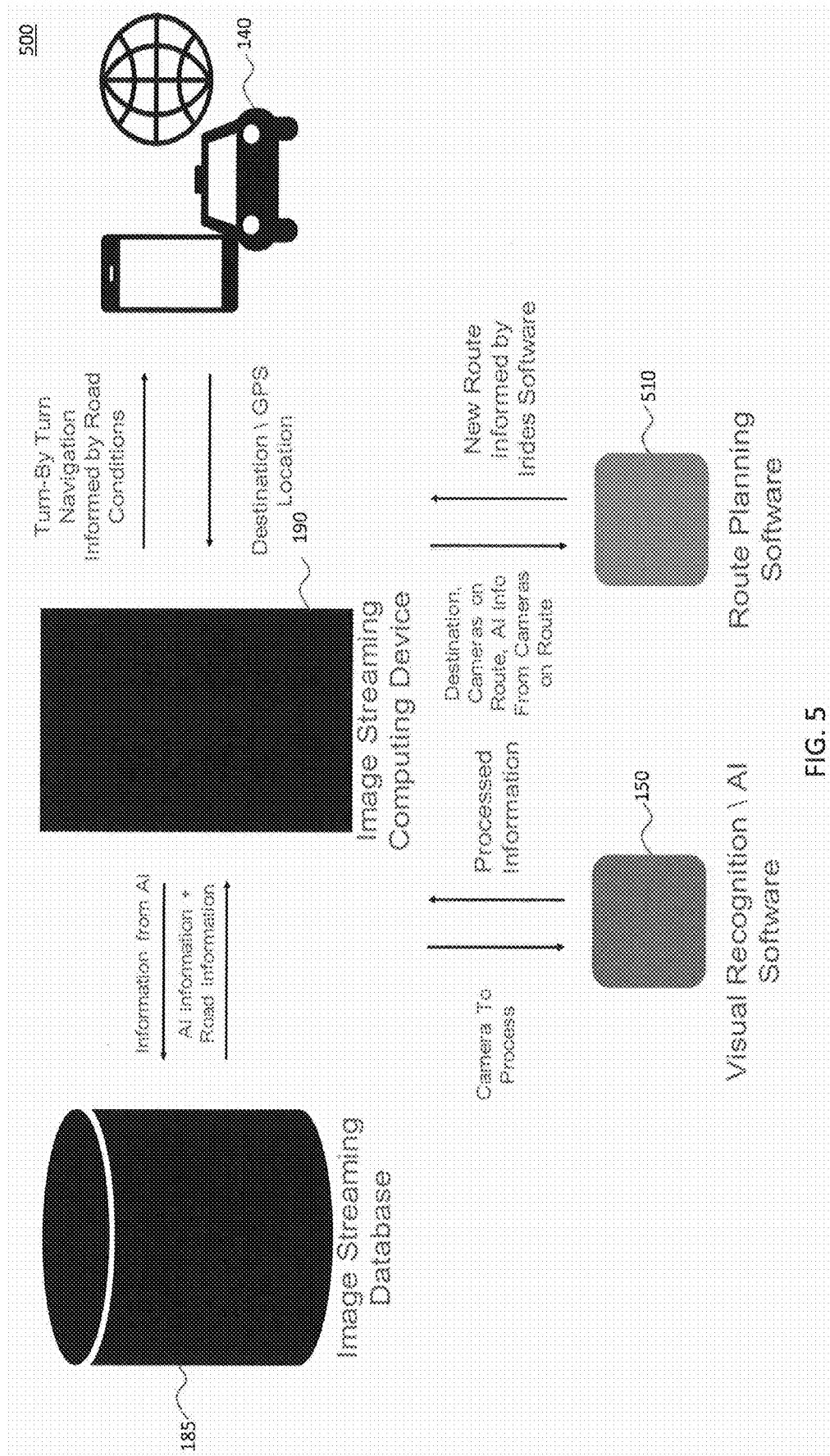
FIG. 5 depicts an illustration of a route planning configuration for determining a route based on road information.

FIG. 5 depicts a route planning configuration 500 for determining a route based on road information. Image streaming database 185 may provide artificial intelligence information and road information to image streaming computing device 190. Image streaming computing device 190 may provide information from artificial intelligence to image streaming database 185. Image streaming computing device 190 may provide camera 110(a-n) to process to visual recognition/artificial intelligence software 150. Visual recognition/artificial intelligence software 150 may provide processed information to image streaming computing device 190. Image streaming computing device 190 may provide destination, cameras 110(a-n) on route, artificial intelligence information from cameras 110(a-n) on route to route planning software 510. Route planning software 510 may provide new route information to image streaming computing device 190. Image streaming computing device 190 may provide turn-by-turn navigation informed by road conditions to entity computing device 140. Entity computing device 140 may provide destination/GPS location to image streaming computing device 190.

Figure 6:
FIG. 6 depicts an illustration of a route planning overlay configuration.

FIG. 6 depicts a route planning overlay configuration 600. The current GPS location of the vehicle 610 is depicted based on the location of the vehicle 610 on the roadway. The current planned route 620 is highlighted and follows the current route as planned for vehicle 610 based on the road information associated with each operating environment of cameras 110(a-n) along the route to the destination of vehicle 610. The current planned route 620 may then change should the road information associated with each operating environment of cameras 110(a-n) along the route to the destination of vehicle 610 change. The image stream 630 as captured by upcoming camera 110(a-n) is overlaid and displayed as the vehicle 610 approaches upcoming camera 110(a-n).

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A system for providing a plurality of image streams captured by a plurality of cameras by scraping a plurality of camera parameters associated with each camera that are updated and analyzed as the cameras capture the image streams, comprising:
   at least one processor;
   a memory coupled with the processor, the memory including instructions that, when executed by the processor cause the processor to:
      scrape each plurality of camera parameters associated with each camera from a corresponding server that stores each plurality of camera parameters associated with each camera as each plurality of camera parameters for each camera is updated in each corresponding server, wherein each plurality of camera parameters provide access to each image stream captured by each corresponding camera as streamed from each corresponding server,
      store each plurality of camera parameters associated with each corresponding camera scraped from each corresponding server in an image streaming database thereby linking the plurality of camera parameters associated with each corresponding camera scraped from each corresponding server to the plurality of camera parameters associated with each corresponding camera as stored in the image streaming database,
      transform each plurality of camera parameters associated with each camera as scraped from each corresponding server into a unique identifier for each camera as thereby stored in the image streaming database, wherein the unique identifier when accessed via the image streaming database enables access to each image stream captured by each camera as streamed from each corresponding server,
      analyze streamed image data as provided by a neural network to determine a plurality of image parameters associated with each image stream captured by each camera as streamed from each corresponding server, wherein the plurality of images is indicative of an operating environment of each image stream that each camera is currently capturing as streamed from each corresponding server as accessed by each unique identifier stored in the image streaming database, and
      provide each image stream captured by each camera as streamed from each corresponding server based on the unique identifier stored in the image streaming database that when accessed enables each image stream captured by each camera to be streamed from each corresponding server via the image streaming database.

2. The system of claim 1, wherein the processor is further configured to:
   continuously stream image stream data to an image streaming server as the image stream data continuously fluctuates as each image stream captured by each camera as streamed from each corresponding server as accessed via each unique identifier stored in the image streaming database;
   automatically receive updated streamed image data that is continuously trained on a neural network based on machine learning as the neural network continuously updates the image stream data based on past image stream data generated from past image streams as captured from each camera as streamed from each corresponding server as accessed via each unique identifier stored in the image streaming database;
   analyze the updated streamed image data as provided by the neural network to determine a plurality of image parameters associated with each image stream captured by each camera as streamed from each corresponding server, wherein the plurality of image parameters is indicative of an operating environment of each image stream that each camera is currently capturing as streamed from each corresponding server as accessed via each unique identifier stored in the image streaming database; and
   continuously stream the plurality of image parameters as the image parameters fluctuate depending on the operating environment that is identified from each image stream as the image parameters are accumulated in the image streaming database to the image streaming server for the neural network to incorporate into the determination of image parameters for additional image streams as past streamed image data.

3. The system of claim 2, wherein the processor is further configured to:
   continuously stream sensor data that is associated with each image stream captured by each camera to the image streaming server as the sensor data continuously fluctuates as each image stream is streamed from each corresponding server as accessed via each unique identifier in the image streaming database;
   automatically receive updated streamed sensor data that is continuously trained on the neural network based on machine learning as the neural network continuously updates the streamed sensor data based on past streamed sensor data associated with past image streams as captured from each camera as streamed from each corresponding server as accessed via each unique identifier in the image streaming database;
   analyze the updated streamed sensor data as provided by the neural network to determine the plurality of image parameters associated with each image stream captured by each camera as streamed from each corresponding server; and
   continuously stream the plurality of image parameters as the image parameters fluctuate depending on the operating environment that is identified from each image stream as the image parameters are accumulated in the image streaming database to the image streaming server for the neural network to incorporate into the determination of image parameters for additional image streams as past streamed image data.

4. The system of claim 2, wherein the processor is further configured to:
analyze a plurality of pixels included in each image stream captured by each camera as streamed by the corresponding server to determine whether the plurality of pixels exceed a pixel threshold, wherein the pixel threshold when exceeded is indicative of an image parameter that the corresponding camera is failing to capture an image stream; and
remove the unique identifier associated with each camera that includes the plurality of pixels that exceed the pixel threshold from the image streaming database and is indicative of the image parameter that the corresponding camera is failing to capture the image stream thereby removing the camera parameters associated with each camera as transformed into the unique identifier from the image streaming database to prevent each camera that is failing to capture an image stream from being accessed in the image streaming database.

5. The system of claim 4, wherein the processor is further configured to:
continuously stream the image data associated with the image parameter that the corresponding camera is failing to capture an image stream as the image data associated with each image parameter that the corresponding camera is failing to capture the image stream are accumulated in the image streaming database to the image streaming server for the neural network to incorporate into the determination each image parameter that the corresponding camera is failing to capture the image stream for additional image streams as past streamed image data.

6. The system of claim 2, wherein the processor is further configured to:
analyze the plurality of pixels included in each image stream captured by each camera as streamed by the corresponding server to determine whether the plurality of pixels exceed a traffic congestion threshold, wherein the traffic congestion threshold is indicative of an image parameter that the corresponding camera is capturing an image stream of congested traffic; and
generate an alert associated with each unique identifier of each camera that includes the plurality of pixels that exceed the traffic congestion threshold and is indicative of the image parameter that the corresponding camera is capturing of the image stream of congested traffic thereby associating with the camera parameters associated with each camera as transformed into the unique identifier the alert that is indicative of the image parameter that the corresponding camera is capturing the image stream of congested traffic as stored in the image streaming database.

7. The system of claim 6, wherein the processor is further configured to:
continuously stream the image data that is associated with the image parameter that the corresponding camera is capturing the image stream of congested traffic as the image data associated with each image parameter that the corresponding camera is capturing the image stream of congested traffic are accumulated in the image streaming database to the image streaming server for the neural network to incorporate into the determination of each image parameter that the corresponding camera is capturing the image stream of congested traffic for additional image streams as past streamed image data.

8. The system of claim 2, wherein the processor is further configured to:
analyze the plurality of pixels included in each image stream captured by each camera as streamed by the corresponding server to determine whether the plurality of pixels exceed a inclement weather threshold, wherein the inclement weather threshold is indicative of an image parameter that the corresponding camera is capturing an image stream of inclement weather; and
generate an alert associated with each unique identifier of each camera that includes the plurality of pixels that exceed the inclement weather threshold and is indicative of the image parameter that the corresponding camera is capturing the image stream of inclement weather thereby associated with the camera parameters associated with each camera as transformed into the unique identifier that the alert is indicative of the image parameter that the corresponding camera is capturing the image stream of inclement weather as stored in the image streaming database.

9. The system of claim 8, wherein the processor is further configured to:
continuously stream the image data that is associated with the image parameter that the corresponding camera is capturing the image stream of inclement weather as the image data associated with each image parameter that the corresponding camera is capturing the image stream of inclement weather are accumulated in the image streaming database to the image streaming server for the neural network to incorporate into the determination of each image parameter that the corresponding camera is capturing the image stream of inclement weather for additional image streams as past streamed image data.

10. The system of claim 9, wherein the processor is further configured to:
analyze the sensor data that is associated with each image stream captured by each camera as streamed by the corresponding server to determine whether the sensor data exceeds the inclement weather threshold; and
generate the alert associated with each unique identifier of each camera that includes the sensor data that exceeds the inclement weather threshold and is indicative of the image parameter that the corresponding camera is capturing the image stream of inclement weather thereby associated with the camera parameters associated with each camera as transformed into the unique identifier that is indicative of the image parameter that the corresponding camera is capturing the image stream of inclement weather as stored in the image streaming database.

11. A method for providing a plurality of image streams captured by a plurality of cameras by scraping a plurality of camera parameters associated with each camera that are updated and analyzed as the cameras capture the image streams, comprising:
scraping each plurality of camera parameters associated with each camera from a corresponding server that stores each plurality of camera parameters associated with each camera as each plurality of camera parameters for each camera is updated in each corresponding server, wherein each plurality of camera parameters provide access to each image stream captured by each corresponding camera as streamed from each corresponding server;

storing each plurality of camera parameters associated with each corresponding camera scraped from each corresponding server in an image streaming database thereby linking the plurality of camera parameters associated with each corresponding camera scraped from each corresponding server to the plurality of camera parameters associated with each corresponding camera as stored in the image streaming database;

transforming each plurality of camera parameters associated with each camera as scraped from each corresponding server into a unique identifier for each camera as thereby stored in the image streaming database, wherein the unique identifier when accessed via the image streaming database enables access to each image stream captured by each camera as streamed from each corresponding server;

analyzing streamed image data as provided by the neural network to determine a plurality of image parameters associated with each image stream captured by each camera as streamed from each corresponding server, wherein the plurality of image parameters is indicative of an operating environment of each image stream that each camera is currently capturing as streamed from each corresponding server as accessed via each unique identifier stored in the image streaming database; and providing each image stream captured by each camera as streamed from each corresponding server based on the unique identifier stored in the image streaming database when accessed enables each image stream captured by each camera to be streamed from each corresponding server via the image streaming database.

12. The method of claim 11, further comprising:

continuously stream image stream data to an image streaming server as the image stream data continuously fluctuates as each image stream captured by each camera as streamed from each corresponding server as accessed via each unique identifier stored in the image streaming database;

automatically receiving updated streamed image data that is continuously trained on a neural network based on machine learning as the neural network continuously updates the image stream data based on past image stream data generated from past image streams as captured from each camera as streamed from each corresponding server as accessed via each unique identifier stored in the image streaming database;

analyzing the updated streamed image data as provided by the neural network to determine a plurality of image parameters associated with each image stream captured by each camera as streamed from each corresponding server, wherein the plurality of image parameters is indicative of an operating environment of each image stream that each camera is currently capturing as streamed from each corresponding server as accessed via each unique identifier stored in the image streaming database; and continuously streaming the plurality of image parameters as the image parameters fluctuate depending on the operating environment that is identified from each image stream as the image parameters are accumulated in the image streaming database to the image streaming server for the neural network to incorporate into the determination of image parameters for additional image streams as past streamed image data.

13. The method of claim 12, further comprising:

continuously streaming sensor data that is associated with each image stream captured by each camera to the image streaming server as the sensor data continuously fluctuates as each image stream is streamed from each corresponding server as accessed via each unique identifier in the image streaming database;

automatically receiving updated streamed sensor data that is continuously trained on the neural network based on machine learning as the neural network continuously updates the streamed sensor data based on past streamed sensor data associated with past image streams as captured from each camera as streamed from each corresponding server as accessed via each unique identifier in the image streaming database;

analyzing the updated streamed sensor data as provided by the neural network to determine the plurality of image parameters associated with each image stream captured by each camera as streamed from each corresponding server; and continuously streaming the plurality of image parameters as the image parameters fluctuate depending on the operating environment that is identified from each image stream as the image parameters are accumulated in the image streaming database to the image streaming server for the neural network to incorporate into the determination of image parameters for additional image streams as past streamed image data.

14. The method of claim 12, further comprising:

analyzing a plurality of pixels included in each image stream captured by each camera as streamed by the corresponding server to determine whether the plurality of pixels exceed a pixel threshold, wherein the pixel threshold when exceeded is indicative of an image parameter that the corresponding camera is failing to capture an image stream; and removing the unique identifier associated with camera that includes the plurality of pixels that exceed the pixel threshold from the image streaming database and is indicative of the image parameter that the corresponding camera is failing to capture the image stream thereby removing the camera parameters associated with each camera as transformed into the unique identifier from the image streaming database to prevent each camera that is failing to capture an image stream from being accessed in the image streaming database.

15. The method of claim 14, further comprising:

continuously streaming the image data associated with the image parameter that the corresponding camera is failing to capture an image stream as the image data associated with each image parameter that the corresponding camera is failing to capture the image stream are accumulated in the image streaming database to the image streaming server for the neural network to incorporate into the determination each image parameter that the corresponding camera is failing to capture the image stream for additional image streams as past streamed image data.

16. The method of claim 12, further comprising:

analyzing the plurality of pixels included in each image stream captured by each camera as streamed by the corresponding server to determine whether the plurality of pixels exceed a traffic congestion threshold, wherein the traffic congestion threshold is indicative of an image parameter that the corresponding camera is capturing an image stream of congested traffic; and generating an alert associated with each unique identifier of each camera that includes the plurality of pixels that exceed the traffic congestion threshold and is indicative of the image parameter that the corresponding camera is capturing of the image stream of congested traffic thereby associating with the camera parameters associated with each camera as transformed into the unique identifier that is indicative that the alert is indicative of the image parameter that the corresponding camera is capturing the image stream of congested traffic as stored in the image streaming database.

17. The method of claim 16, further comprising: continuously streaming the image data that is associated with the image parameter that the corresponding camera is capturing the image stream of congested traffic as the image data associated with each image parameter that the corresponding camera is capturing the image stream of congested traffic are accumulated in the image streaming database to the image streaming server for the neural network to incorporate into the determination of each image parameter that the corresponding camera is capturing the image stream of congested traffic for additional images streams as past streamed image data.

18. The method of claim 12, further comprising:
analyzing the plurality of pixels included in each image stream captured by each camera as streamed by the corresponding server to determine whether the plurality of pixels exceed an inclement weather threshold, wherein the inclement weather threshold is indicative of an image parameter that the corresponding camera is capturing an image stream of inclement weather; and
generating an alert associated with each unique identifier of each camera that includes the plurality of pixels that exceed the inclement weather threshold and is indicative of the image parameter that the corresponding camera is capturing the image stream of inclement weather thereby associated with the camera parameters associated with each camera as transformed into the unique identifier that the alert is indicative of the image parameter that the corresponding camera is capturing the image stream of inclement weather as stored in the image streaming database.

19. The method of claim 18, further comprising:
continuously streaming the image data that is associated with the image parameter that the corresponding camera is capturing the image stream of inclement weather as the image data associated with each image parameter that the corresponding camera is capturing the image stream of inclement weather are accumulated in the image streaming database to the image streaming server for the neural network to incorporate into the determination of each image parameter that the corresponding camera is capturing the image stream of inclement weather for additional image streams as past streamed image data.

20. The method of claim 19, further comprising:
analyzing the sensor data that is associated with each image stream captured by each camera as streamed by the corresponding server to determine whether the sensor data exceeds the inclement weather threshold; and
generating the alert associated with each unique identifier of each camera that includes the sensor data that exceeds the inclement weather threshold and is indicative of the image parameter that the corresponding camera is capturing the image stream of inclement weather thereby associated with the camera parameters associated with each camera as transformed into the unique identifier that is indicative of the image parameter that the corresponding camera is capturing the image stream of inclement weather as stored in the image streaming database.

* * * * *